(12) United States Patent
Geirhofer et al.

(10) Patent No.: US 9,258,039 B2
(45) Date of Patent: Feb. 9, 2016

(54) DEVICES FOR SENDING AND RECEIVING QUANTIZATION QUALITY FEEDBACK

(75) Inventors: Stefan Geirhofer, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 25 days.

(21) Appl. No.: 13/605,413

(22) Filed: Sep. 6, 2012

(65) Prior Publication Data
US 2013/0235911 A1 Sep. 12, 2013

Related U.S. Application Data

(60) Provisional application No. 61/532,219, filed on Sep. 8, 2011.

(51) Int. Cl.
*H04B 1/38* (2015.01)
*H04B 7/04* (2006.01)
(Continued)

(52) U.S. Cl.
CPC ............ *H04B 7/0417* (2013.01); *H04B 7/0478* (2013.01); *H04B 7/065* (2013.01);
(Continued)

(58) Field of Classification Search
CPC .. H04B 7/0639; H04B 7/0456; H04B 7/0417; H04B 7/0408; H04B 7/0478; H04B 7/0617; H04B 7/0634; H04B 7/0658; H04B 7/063; H04B 7/0413; H04B 7/0632; H04B 7/0647; H04B 7/022; H04B 7/0619; H04B 7/065; H04B 17/0067; H04B 7/0421; H04B 7/0469; H04B 7/066; H04B 7/086; H04B 17/0042; H04B 17/0057; H04B 7/0643; H04B 7/0652; H04L 25/03343; H04L 2025/03426; H04L 5/0023; H04L 2025/038; H04L 25/0248; H04L 25/022; H04L 25/0242; H04L 25/03898; H04L 25/03949; H04L 5/0048; H04L 5/0053; H04L 5/0057; H04L 1/0687; H04L 1/0693
USPC ......... 375/219, 260, 262, 265, 267, 340, 343, 375/346; 370/203, 204, 208, 209
See application file for complete search history.

(56) References Cited

U.S. PATENT DOCUMENTS 7,825,842 B2    11/2010  Rheinfelder et al.
8,432,990 B2 *   4/2013  Tang et al. .................... 375/267
(Continued)

FOREIGN PATENT DOCUMENTS

EP    1944883 A2    7/2008
EP    2187533 A1    5/2010
(Continued)

OTHER PUBLICATIONS

Huang, K et al., "Event-Driven Optimal Feedback Control for Multiantenna Beamforming", IEEE Transactions on Signal Processing, IEEE Service Center, New York, NY, US, vol. 58, No. 6, Jun. 1, 2010, pp. 3298-3312, XP011305552, ISSN: 1053-587X abstract; figures 1, 2—sections I.A, I.B, II, III.
Hwang I., et al., "Downlink transmission rate-control strategies for closed-loop multiple-input multiple-output systems", IET Communications, vol. 3, No. 4, Apr. 6, 2009, pp. 620-629, XP006032874, ISSN: 1751-8636, DOI: 10.1049/IET-COM:20080456 figure 3 sections 1, 5.
International Search Report and Written Opinion—PCT/US2012/054119—ISA/EPO—Sep. 6, 2013.
Islam, M.N. et al., "Transceiver design using linear precoding in a multiuser multiple-input multiple-output system with limited feedback", IET Comminucations,, vol. 5, No. 1, Jan. 4, 2011, pp. 27-38, XP006037362, ISSN: 1751-8636, DOI:10.1049/IET-COM:20100015 abstract sections 1, 3.1, 4.1.
Li W., et al., "Codebook Based Beamforming in MIMO Broadcast Channels with Finite Rate Feedback", 2009 1st International Conference on Information Science and Engineering (ICISE 2009)—Dec. 26-28, 2009—Nanjing, China, IEEE, Piscataway, NJ, USA, Dec. 26, 2009, pp. 2582-2585, XP031663158, ISBN: 978-1-4244-4909-5 abstract sections I, II.B, III.A.
Partial International Search Report—PCT/US2012/054119—ISA/EPO—Jul. 11, 2013.
Xia, X et al., "Joint User Pairing and Precoding in MU-MIMO Broadcast Channel with Limited Feedback", IEEE Communications Letters, IEEE Service, Center, Piscataway, NJ, US, vol. 14, No. 11, Nov. 1, 2010, pp. 1032-1034, XP011319714, ISSN: 1089-7798, abstract; figure 1, sections II, III.A, III.B, IV.
(Continued)

*Primary Examiner* — Dhaval Patel
(74) *Attorney, Agent, or Firm* — Austin Rapp & Hardman

(57) ABSTRACT

A wireless communication device for sending quantization quality feedback is described. The wireless communication device includes a receiver that receives a signal. The wireless communication device also includes channel estimation circuitry coupled to the receiver. The channel estimation circuitry generates a channel estimate based on the signal. The wireless communication device also includes feedback determination circuitry coupled to the channel estimation circuitry. The feedback determination circuitry generates quantization quality feedback based on the channel estimate. The wireless communication device also includes a transmitter coupled to the feedback determination circuitry. The transmitter transmits the quantization quality feedback.

48 Claims, 14 Drawing Sheets

(51) Int. Cl.
*H04L 1/00* (2006.01)
*H04L 1/20* (2006.01)
*H04L 25/02* (2006.01)
*H04L 25/03* (2006.01)
*H04B 7/02* (2006.01)
*H04B 7/06* (2006.01)

(52) U.S. Cl.
CPC .......... *H04B 7/0654* (2013.01); *H04L 1/0026* (2013.01); *H04L 1/20* (2013.01); *H04L 25/03955* (2013.01); *H04B 7/024* (2013.01); *H04B 7/0639* (2013.01); *H04L 1/0003* (2013.01); *H04L 1/0009* (2013.01); *H04L 25/0204* (2013.01); *H04L 25/0248* (2013.01); *H04L 25/03898* (2013.01)

(56) References Cited

U.S. PATENT DOCUMENTS

| | | | |
|---|---|---|---|
| 8,472,506 B2* | 6/2013 | Kent et al. | 375/146 |
| 2008/0165868 A1 | 7/2008 | Kent et al. | |
| 2009/0219865 A1 | 9/2009 | Salzer et al. | |
| 2010/0091892 A1 | 4/2010 | Gorokhov | |
| 2010/0091893 A1 | 4/2010 | Gorokhov | |
| 2011/0002263 A1 | 1/2011 | Zhu et al. | |
| 2011/0032835 A1* | 2/2011 | Zhu et al. | 370/252 |
| 2011/0150111 A1 | 6/2011 | Oyman et al. | |

FOREIGN PATENT DOCUMENTS

| | | |
|---|---|---|
| EP | 2282431 A2 | 2/2011 |
| EP | 2357767 A1 | 8/2011 |
| JP | 2011035912 A | 2/2011 |
| WO | 2011021261 A1 | 2/2011 |

OTHER PUBLICATIONS

Xu W., et al., "Limited Feedback Multiuser Scheduling of Spatially Correlated Broadcast Channels", IEEE Transactions on Vehicular Technology, IEEE Service Center, Piscataway, NJ, US, vol. 58, No. 8, Oct. 1, 2009, pp. 4406-4418, XP011268207, ISSN: 0018-9545, DOI: 10.1109/TVT.2009.2020725 abstract; figure 1 sections I, III, IV.B, IV.C.

ZTE: "Consideration on Enhancement of MU-MIMO Feedback Schemes", 3GPP Draft; R1-100527 MU Enhancement, 3rd Generation Partnership Project (3GPP), Mobile Competence Centre; 650, Route Des Lucioles; F-06921 Sophia-Antipolis Cedex; France, vol. RAN WG1, no. Valencia, Spain; 20100118, Jan. 12, 2010, XP050418156, [retrieved on Jan. 12, 2010] sections 1, 4.2, 4.3, 5.

* cited by examiner

DEVICES FOR SENDING AND RECEIVING QUANTIZATION QUALITY FEEDBACK

RELATED APPLICATIONS

This application is related to and claims priority from U.S. Provisional Patent Application Ser. No. 61/532,219 filed Sep. 8, 2011, for "QUANTIZATION ERROR FEEDBACK FOR ENHANCED SCHEDULING AND RATE PREDICTION PERFORMANCE", and assigned to the assignee hereof and hereby expressly incorporated by reference herein.

TECHNICAL FIELD

The present disclosure relates generally to communication systems. More specifically, the present disclosure relates to sending and receiving quantization quality feedback.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.). Some communication devices (e.g., access terminals, laptop computers, smart phones, media players, gaming devices, etc.) may wirelessly communicate with other communication devices.

In the last several decades, the use of wireless communication devices has become common. In particular, advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices.

Improving communications performance poses many challenges. For example, communications performance may depend on channel feedback. However, it may be difficult to improve channel feedback with a limited amount of overhead signaling. As can be observed from this discussion, systems and methods that improve channel feedback may be beneficial.

SUMMARY

A wireless communication device for sending quantization quality feedback is described. The wireless communication device includes a receiver that receives a signal. The wireless communication device also includes channel estimation circuitry coupled to the receiver. The channel estimation circuitry generates a channel estimate based on the signal. The wireless communication device also includes feedback determination circuitry coupled to the channel estimation circuitry. The feedback determination circuitry generates quantization quality feedback based on the channel estimate. The wireless communication device also includes a transmitter coupled to the feedback determination circuitry. The transmitter transmits the quantization quality feedback. The feedback determination circuitry may also quantize the quantization quality feedback.

The quantization quality feedback may include a scalar value. The quantization quality feedback may include a metric that measures the quantization quality. The quantization quality feedback may be generated based on an estimated feedback and a quantized feedback. The quantization quality feedback may be generated based on one or more estimated eigen-directions and one or more quantized eigen-directions. The feedback determination circuitry may quantize the one or more estimated eigen-directions based on a codebook.

A base station for receiving quantization quality feedback is also described. The base station may include a transmitter that sends a signal. The base station also includes a receiver that receives quantization quality feedback. The base station further includes operations circuitry coupled to the receiver. The operations circuitry performs an operation based on the quantization quality feedback. Performing an operation may include extrapolating information based on the quantization quality feedback, determining a communication rate, determining a modulation for a communication channel, selecting a communication beam, determining link adaptation, determining interference suppression, determining a coding for a communication channel and/or scheduling communications. Scheduling communications may include determining a wireless communication device grouping. The quantization quality feedback may include a scalar value.

A method for sending quantization quality feedback by a wireless communication device is also described. The method includes receiving a signal. The method also includes generating a channel estimate based on the signal. The method further includes generating quantization quality feedback based on the channel estimate. The method also includes transmitting the quantization quality feedback.

A method for receiving quantization quality feedback by a base station is also described. The method includes sending a signal. The method also includes receiving quantization quality feedback. The method further includes performing an operation based on the quantization quality feedback.

A computer-program product for sending quantization quality feedback is also described. The computer-program product includes a non-transitory tangible computer-readable medium with instructions. The instructions include code for causing a wireless communication device to receive a signal. The instructions also include code for causing the wireless communication device to generate a channel estimate based on the signal. The instructions further include code for causing the wireless communication device to generate quantization quality feedback based on the channel estimate. The instructions additionally include code for causing the wireless communication device to transmit the quantization quality feedback.

A computer-program product for receiving quantization quality feedback is also described. The computer-program product includes a non-transitory tangible computer-readable medium with instructions. The instructions include code for causing a base station to send a signal. The instructions also include code for causing the base station to receive quantization quality feedback. The instructions further include code for causing the base station to perform an operation based on the quantization quality feedback.

An apparatus for sending quantization quality feedback is also described. The apparatus includes means for receiving a signal. The apparatus also includes means for generating a channel estimate based on the signal. The apparatus further includes means for generating quantization quality feedback based on the channel estimate. The apparatus additionally includes means for transmitting the quantization quality feedback.

An apparatus for receiving quantization quality feedback is also described. The apparatus includes means for sending a signal. The apparatus also includes means for receiving quantization quality feedback. The apparatus further includes means for performing an operation based on the quantization quality feedback.

DETAILED DESCRIPTION

Figure 1:
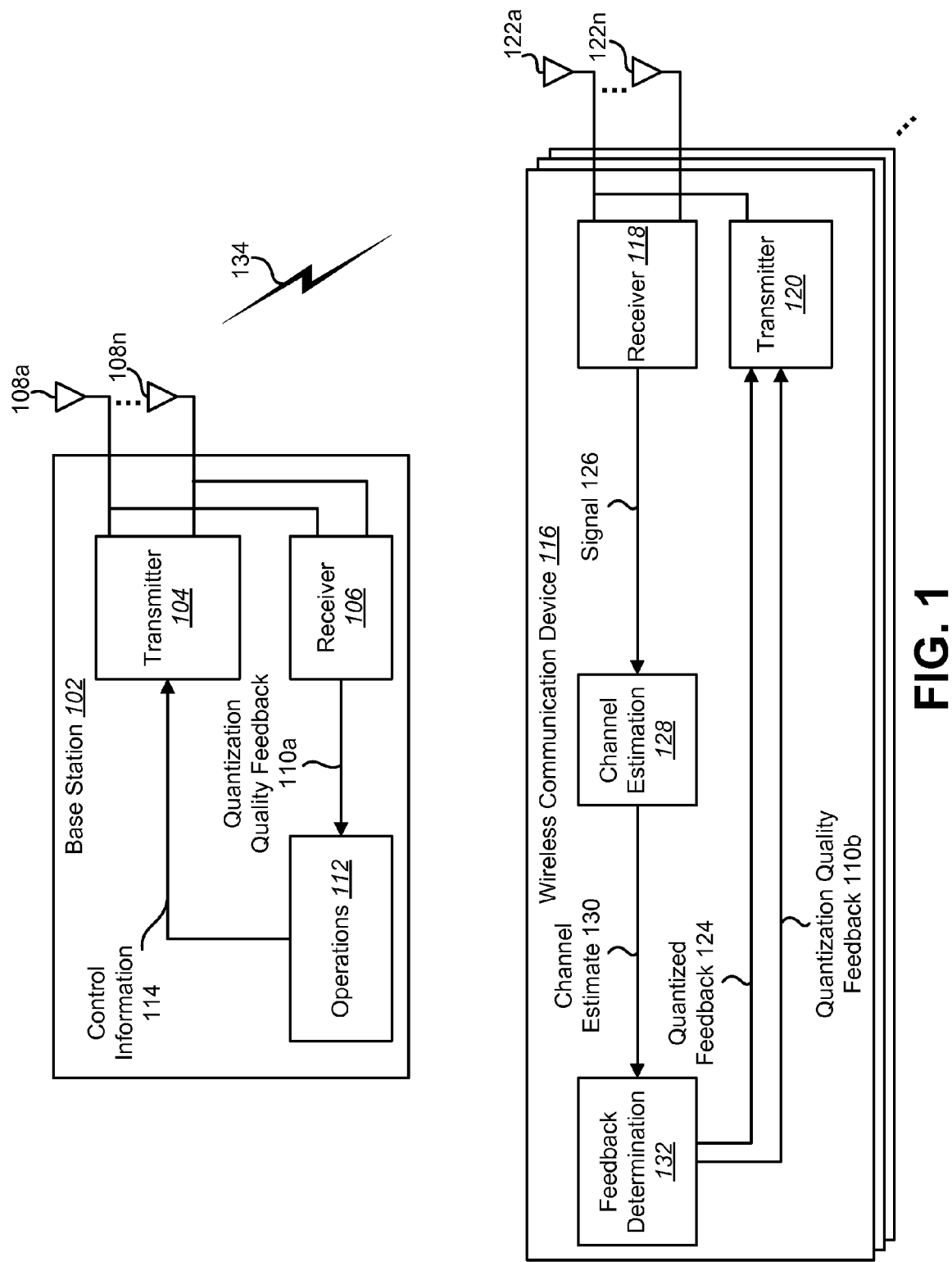
FIG. 1 is a block diagram illustrating one configuration of a base station and one or more wireless communication devices in which systems and methods for sending and receiving quantization quality feedback may be implemented.

Examples of communication devices include cellular telephone base stations or nodes, access points, wireless gateways and wireless routers. A communication device may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, IEEE 802.16 (e.g., Worldwide Interoperability for Microwave Access or "WiMAX") standard and others. In some standards, a communication device may be referred to as a Node B, evolved Node B, etc. While some of the systems and methods disclosed herein may be described in terms of one or more standards, this should not limit the scope of the disclosure, as the systems and methods may be applicable to many systems and/or standards.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

Feedback enhancements are an important aspect of Long Term Evolution-Advanced (LTE-A). Numerous techniques on how to improve feedback performance have been proposed, especially for multi-user multiple input and multiple output (MU-MIMO) and cooperative multi-point (CoMP). Results of internal and external studies show that improved feedback can have a significant impact on beam selection and link adaptation, especially when performing transmit interference nulling performance at the network side (such as to suppress interference in multi-user multiple input and multiple output and cooperative multi-point).

The design of channel state information (CSI) feedback fundamentally needs to strike a balance between performance and uplink feedback overhead. In the context of LTE Release 10, a fairly low feedback granularity of 4-bits has been agreed for four transmit antenna (e.g., 4Tx). While this is adequate for single user multiple input and multiple output (SU-MIMO) operation, it significantly affects the network's ability to perform transmit interference nulling, such as in multi-user multiple input and multiple output or cooperative multi-point.

Aside from the beam selection process, the channel state information uncertainty also impacts the rate prediction performance at the evolved Node B and negatively affects link adaptation. Specifically, the estimated spectral efficiency that the evolved Node B extrapolates conditioned on its beam selection may contain a large degree of uncertainty and therefore may complicate the selection of an appropriate packet format and modulation scheme for transmission.

The systems and methods disclosed herein may help to improve communications between a wireless communication device (e.g., a user equipment) and a base station (e.g., an evolved Node B). For example, the systems and methods disclosed herein may improve scheduling and rate prediction at the network side by providing quantization quality feedback. For instance, a user equipment may send a quantization quality metric to the evolved Node B. By doing so, the network can factor channel state information uncertainty into scheduling and/or rate prediction procedures and thus improve performance.

In one configuration, the systems and methods herein describe improving scheduling and rate prediction by feeding back a metric capturing the quantization quality as part of the channel state information feedback of the user equipment. This concept may apply to various feedback frameworks, including but not limited to implicit precoding matrix indicator/channel quality indicator/rank indicator (PMI/CQI/RI) feedback and/or explicit feedback of dominant eigen-directions.

For example, in an explicit feedback framework, the aforementioned quantization quality metric could be defined as follows. First, the user equipment computes the dominant eigen-directions by performing a singular value decomposition (SVD) of its channel estimate. An i-th dominant eigen-direction (i.e., the i-th right-singular vectors of the channel matrix) may be denoted by $v_i$. As part of the explicit feedback paradigm, the user equipment would typically quantize the $v_i$ by a given codebook, for example by finding a codebook entry j that maximizes the metric $D(v_i, \bar{v}_j)$ as illustrated in Equation (1).

$$D(v_i, \bar{v}_j) = \frac{v_i^H \bar{v}_j}{|v_i^H \bar{v}_j|} \quad (1)$$

In Equation (1), $\bar{v}_j$ corresponds to the j-th entry in the codebook. Typically, only the index of the selected codebook entry j is fed back. In contrast, one configuration of the systems and methods disclosed herein describes feeding back a quantized version of the above metric D itself, so that the network can gauge the quality or fidelity of the channel state information report after quantization. As illustrated above, Equation (1) provides a metric that reflects how similar or different the estimated (e.g., "true") eigen-directions are compared to the quantized eigen-directions. For instance, D may range from 0 to 1, where 0 indicates that the two vectors are orthogonal and 1 indicates that the two vectors are the same (perhaps aside from some scaling factor, for example). It should be noted that the metric D in Equation (1) is given as an example. Other metrics may be used to convey the impact of quantization quality as well. In some configurations, multiple quantization quality feedback reports may be sent, for example when multiple eigen-directions are considered as part of the feedback.

The above example is not limited to explicit feedback but could also be carried out in an implicit feedback framework. This extension is straightforward in the rank-1 case. For higher ranks, the columns of the respective precoding matrices could be used. Potentially, the quantization quality feedback could also be restricted to the dominant layer in this case.

Another metric that may be used to capture the fidelity of the channel state indicator feedback quantization is the channel quality indicators generated under different precoding matrix indicator hypotheses. For example, in the precoding matrix indicator/channel quality indicator/rank indicator feedback framework, it is typical to evaluate the user equipment capacity under all precoding matrix indicator hypotheses. After doing so, the best precoding matrix indicator is fed back together with the channel quality indicator computed corresponding to the anticipated capacity. In this framework, it may be more convenient to assess the precoding matrix indicator quantization error by comparing the channel quality indicator under different precoding matrix indicator hypotheses (for example, considering the M best precoding matrix indicators). In one case, for example, the ratio of the best and second best precoding matrix indicator could be fed back to give an indication of how close the performance of these precoding matrix indicators is. Again, it should be noted that this last example is used for illustration. Other metrics may also be used to convey quantization quality feedback and may be preferable due to other factors, such as implementation specific considerations.

Some potential applications of quantization quality feedback are given hereafter. Rate prediction and associated scheduling enhancements are important applications for quantization quality feedback. Specifically, whenever the evolved Node B does not straightforwardly follow the precoding matrix indicator/channel quality indicator/rank indicator feedback generated by the user equipment, the channel quality indicator feedback of the user equipment may need to be extrapolated. This may occur, for example, when applying transmit interference nulling at the network side (such as in multi-user multiple input and multiple output system). Additionally or alternatively, channel quality indicator feedback may be extrapolated when co-scheduling user equipments on the same resources in a distributed antenna system (such as in cooperative multi-point). In such cases, the quantization of a precoding matrix indicator and channel quality indicator may make it difficult at the network side to predict the anticipated performance at the user equipment accurately (due to additional interference due to co-scheduling multiple user equipments, for example).

To extrapolate the channel quality indicator at the network side under the assumption of co-scheduling multiple user equipments, the network may use the knowledge of the fed back eigen-directions. However, this extrapolation may be quite inaccurate as, for coarse quantization, many different channel realizations could have given rise to the same channel direction feedback. Quantization quality feedback should therefore be viewed as a side metric that captures the quality or fidelity of the quantization and captures the uncertainty that may be associated with it. Correspondingly, the network therefore knows how accurate it can expect the extrapolated channel quality indicators value to be and perform modulation and coding scheme (MCS) selection accordingly. In one configuration, for example, the network may perform a modulation and coding scheme selection more aggressively whenever the fed back quantization quality metric is low (therefore indicating a relatively good quantization) and more conservatively if the quantization error metric is large (indicating relatively poor quantization).

In addition to improving rate prediction as described above, the quantization quality feedback may also help to improve scheduling performance by improving the user equipment grouping. For example, it may be preferable to schedule user equipments with good quantization quality feedback over user equipments that currently encounter poor quantization performance. Likewise, transmission schemes that are less sensitive to quantization error (for example, single user multiple input and multiple output transmission) may be selected for user equipments with relatively poor quantization quality feedback.

It should be noted that the proposal of quantization quality feedback shares some conceptual similarities with multi-user channel quality indicator (MU-CQI) feedback that also helps improve rate prediction performance for multi-user multiple input and multiple output. However, it is important to point out that the concept of quantization quality feedback is more general, especially as it does not need to make an assumption on the co-scheduled precoding matrix indicators. This becomes important when finer codebooks are considered for which it is difficult to find appropriate multi-user channel quality indicator pairing tables (for the purpose of computing the multi-user channel quality indicator).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed but is merely representative of the systems and methods. It should be noted that one or more features and/or elements depicted in a Figure may be combined with one or more features and/or elements depicted in one or more other Figures.

FIG. 1 is a block diagram illustrating one configuration of a base station 102 and one or more wireless communication devices 116 in which systems and methods for sending and receiving quantization quality feedback 110 may be implemented. Examples of the base station 102 include cellular phone base stations, access points, etc. Examples of the wireless communication device(s) 116 include user equipments, access terminals, stations, etc.

The base station 102 may include a transmitter 104, a receiver 106, one or more antennas 108a-n and/or an operations block/module 112. As used herein, the term "block/module" may indicate that a particular element may be implemented in hardware, software, firmware or a combination thereof. For example, the operations block/module 112 may be implemented in hardware (e.g., circuitry), software or a combination of both. It should also be noted that one or more of the elements illustrated in FIG. 1 may be implemented in circuitry (e.g., integrated circuitry) in some configurations.

The transmitter 104 may include one or more elements used to format and transmit signals. For example, the transmitter 104 may include a modulator, an encoder, an upconverter, a power amplifier, etc. For convenience, only one transmitter 104 is illustrated in the base station 102 in FIG. 1. However, multiple transmitters 104 (e.g., multiple transmission paths) may be implemented in the base station 102 in some configurations. The receiver 106 may include one or more elements used to receive and deformat signals. For example, the receiver 106 may include a demodulator, a decoder, a downconverter, a low-noise amplifier, etc. For convenience, only one receiver 106 is illustrated in the base station 102 in FIG. 1. However, multiple receivers 106 (e.g., multiple reception paths) may be implemented in the base station 102 in some configurations. The receiver 106 may provide quantization quality feedback 110a to the operations block/module 112. The operations block/module 112 may perform one or more operations based on the quantization quality feedback 110a. Optionally, the operations block/module 112 may provide control information 114 to the transmitter 104. The transmitter 104 may then transmit the control information 114 to one or more wireless communication devices 116.

The wireless communication device 116 may include a transmitter 120, a receiver 118, one or more antennas 122a-n, a channel estimation block/module 128 and/or a feedback determination block/module 132. The transmitter 120 may include one or more elements used to format and transmit signals. For example, the transmitter 120 may include a modulator, an encoder, an upconverter, a power amplifier, etc. For convenience, only one transmitter 120 is illustrated in the wireless communication device 116 in FIG. 1. However, multiple transmitters 120 (e.g., multiple transmission paths) may be implemented in the wireless communication device 116 in some configurations. The receiver 118 may include one or more elements used to receive and deformat signals. For example, the receiver 118 may include a demodulator, a decoder, a downconverter, a low-noise amplifier, etc. For convenience, only one receiver 118 is illustrated in the wireless communication device 116 in FIG. 1. However, multiple receivers 118 (e.g., multiple reception paths) may be implemented in the wireless communication device 116 in some configurations. The base station 102 may communicate with the wireless communication device 116 via a link 134. In some examples, the link 134 may be a wireless link that allows the base station 102 to wirelessly communicate with one or more wireless communication devices 116.

The base station 102 may transmit a signal 126 to the one or more wireless communication devices 116 for channel estimation. For example, the base station 102 may transmit a signal 126 that may be used in channel estimation. In some examples, the signal 126 may be wireless communication signal. A receiver 118 of the wireless communication device 116 may receive the signal 126 and provide the signal 126 to the channel estimation block/module 128 for channel estimation. The channel estimation block/module 128 may generate a channel estimate 130 based on the signal 126. The channel estimate 130 may include a measurement of one or more channel properties of the received signal 126. For example, the channel estimate 130 may indicate how the signal 126 propagates from the transmitter 104 of the base station 102 to the receiver 118 of the wireless communication device 116. Examples of measurements that may be included in a channel estimate 130 include, but are not limited to channel gain, fading distribution, signal strength, scatter, phase shift, frequency offset, directionality and power decay. The channel estimation block/module 128 may provide the channel estimate 130 to the feedback determination block/module 132.

Based on the channel estimate 130, the feedback determination block/module 132 may generate quantized feedback 124. Examples of quantized feedback 124 include quantized vectors (e.g., eigen-directions), a codebook entry indicator (that specifies a set of vectors, for instance), a quantized precoding matrix, a precoding matrix indicator, a channel quality indicator, a rank indicator, etc.

In some implementations, the quantized feedback 124 may be based on explicit feedback. For example, the feedback determination block/module 132 may compute one or more eigen-directions, for example by performing a singular value decomposition of the channel estimate 130. The feedback determination block/module 132 may then generate quantized feedback 124 by quantizing the one or more eigen-directions. In some configurations, the feedback determination block/module 132 may use a codebook to quantize the one or more eigen-directions.

Alternatively or additionally, the quantized feedback 124 may include implicit feedback. For example, the feedback determination block/module 132 may evaluate the wireless communication device 116 communication capacity under one or more precoding matrix indicator hypotheses. The feedback determination block/module 132 may generate one or more channel quality indicators that indicate the quality of communication for a given precoding matrix indicator hypothesis. In this example, the quantized feedback 124 may include the one or more precoding matrices and/or one or more channel quality indicators. In some configurations, the one or more precoding matrices may correspond to different transmission ranks.

In some configurations, the feedback determination block/module 132 may generate quantized feedback 124 based on a metric that indicates the quality of quantization. For example, the wireless communication device 116 may generate a metric (e.g., the metric D as illustrated in Equation (1)) that indicates the quality of quantization. In some configurations, the feedback determination block/module 132 may generate quantized feedback 124 (e.g., one or more quantized eigen-directions) in order to maximize the metric (by selecting feedback corresponding to the highest metric in a set, for example).

In some implementations, the feedback determination block/module 132 may generate multiple instances of quantized feedback 124. For example, if multiple eigen-directions are computed, the feedback determination block/module 132 may generate multiple instances of quantized feedback 124 that correspond to the multiple eigen-directions.

The feedback determination block/module 132 may generate quantization quality feedback 110b. Quantization quality feedback 110b may include a measure of the quality of the quantized feedback 124. For example, the quantization quality feedback 110b may indicate the level of uncertainty, reliability and/or accuracy of the quantized feedback 124. For example, as described above, the operations block/module 112 of the base station 102 may perform one or more operations based on the quantized feedback 124. In this example, the quantization quality feedback 110b may communicate the reliability of the received quantized feedback 124. Based on this information, the base station 102 may perform one or more operations.

In some examples, the quantization quality feedback 110b may be based on estimated feedback (e.g., eigen-directions based on the channel estimate) and the quantized feedback 124 (e.g., quantized eigen-directions). In this example, the quantization quality feedback 110b may reflect a relationship between the estimated feedback and the quantized feedback.

In accordance with the systems and methods disclosed herein, several approaches may be used to generate the quantization quality feedback 110b. For example, the feedback determination block/module 132 may generate a metric for use in explicit feedback cases. In one configuration, the quantized feedback 124 may comprise a set of vectors (e.g., eigen-directions) and/or a codebook entry or index that indicates a set of vectors. For instance, the quantized feedback 124 may be $\bar{v}_j$ and/or j as described above.

The feedback determination block/module 132 may generate a metric that indicates the quantization quality (based on $\bar{v}_j$ and $v_i$, for instance). For example, the feedback determination block/module 132 may generate the metric D as illustrated in Equation (1) that indicates the quality of the quantized feedback 124 (e.g., the quantized eigen-directions). In this example, the quantized feedback 124 (e.g., set of vectors and/or the codebook entry or index that indicates a set of vectors) may be transmitted to the base station 102. Additionally or alternatively, the metric D may be transmitted to the base station 102 as quantization quality feedback 110b.

In another example, the quantization quality feedback 110b may include a metric for use in implicit feedback cases. The metric may be based on one or more hypothetical performance values. For example, the quantized feedback 124 may comprise one or more quantized precoding matrices and/or indices or values indicating the one or more quantized precoding matrices. The wireless communication device 116 may generate one or more hypothetical performance values (e.g., channel quality indicators) corresponding to the precoding matrices. The wireless communication device 116 may compare the hypothetical performance values for the one or more precoding matrices, for example by ranking the hypothetical performance values. In one example, the ratio of the best and second best precoding matrix indicators, as indicated by the corresponding hypothetical performance values, may be transmitted as quantization quality feedback 110b. Additionally or alternatively, a ratio of the two hypothetical performance values corresponding to the best and second best precoding matrix indicators may be transmitted as quantization quality feedback 110b. The base station 102 may then perform operations based on the quantization quality feedback 110a. In this example, the quantized feedback 124 may be the one or more precoding matrices, the indices of the one or more precoding matrices and/or the hypothetical performance values associated with the one or more precoding matrices.

In some configurations, the quantization quality feedback 110b may be a scalar value that indicates the quality of the quantization. For example, the quantization quality feedback 110b may be a scalar value (e.g., the metric D in Equation (1) and the ratio of the precoding matrix indicators) that indicates the quality of the quantized feedback 124.

In some configurations, the quantization quality feedback 110b may be quantized. For example, the metric D described above in Equation (1) may be determined. Then, the wireless communication device 116 may quantize D, which may be sent as the quantization quality feedback 110b. One or more quantization techniques may be applied. For example, a closest codebook entry to a metric value may be selected, the metric may be rounded to a nearest integer value, a value may be selected from a set of discrete values based on the metric, etc. The result of the quantization technique applied may be provided as the quantization quality feedback 110b.

The quantized feedback 124 and the quantization quality feedback 110b may be provided to the transmitter 120 for transmission to the base station 102. For example, implicit or explicit quantized feedback 124 and/or quantization quality feedback 110b pertaining to the quantized feedback 124 may be provided to the transmitter 120, which transmits the information to the base station 102. In some examples, the quantized feedback 124 and/or the quantization quality feedback 110b may be provided to the transmitter 120 as part of a channel state information report.

Multiple instances of quantization quality feedback 110b may be provided to the transmitter 120 for transmission to the base station 102. For example, in an explicit feedback case, one or more eigen-directions may be computed based on the channel estimate 130. These one or more eigen-directions may be quantized based on a codebook. In this example, quantization quality feedback 110b may be generated for each quantized eigen-direction. The multiple instances of quantization quality feedback 110b may be provided to the transmitter 120 for transmission to the base station 102.

The base station 102 may receive the quantized feedback 124 and the quantization quality feedback 110a through the receiver 106. The quantization quality feedback 110a may be provided to the operations block/module 112. The operations block/module 112 may perform one or more operations based on the quantization quality feedback 110a. For example, the operations block/module 112 may determine the modulation and coding scheme for the communication channel with a wireless communication device 116 based on the quantization quality feedback 110a. The operations block/module 112 may schedule wireless communications. Examples of scheduling operations include, but is not limited to, wireless communication device 116 grouping and selection of transmission format.

The operations block/module 112 may extrapolate information based on the quantization quality feedback 110a. For example, the operations block/module 112 may extrapolate a channel quality indicator based on quantization quality feedback 110a to aid in transmission interference nulling.

Other examples of operations that may be performed include, but are not limited to, communication rate prediction, beam selection, link adaptation, interference assessment, interference suppression, nulling, co-scheduling in a distributed antenna system (e.g., cooperative multi-point), etc., for use in communications with the one or more wireless communication devices 116. One or more of these operations may be performed as described above.

In some configurations, the operations block/module 112 may provide control information 114 to the transmitter 104 for transmission to one or more wireless communication devices 116. The control information 114 may indicate communication control information, such as modulation, coding, wireless communication device grouping assignments, scheduling, rate, etc., which may be used by one or more wireless communication devices 116 to send data to and/or receive data from the base station 102.

In some implementations, the control information 114 may be based on the quantization quality feedback 110a. For example, if the operations block/module 112 receives poor quantization quality feedback 110a from a wireless communication device 116, the operations block/module 112 may adapt the link accordingly. In this example, control information 114 reflecting the link adaption may be transmitted to the wireless communication device 116, which may be used by the wireless communication device 116 to send data to and/or receive data from the base station 102.

Figure 2:
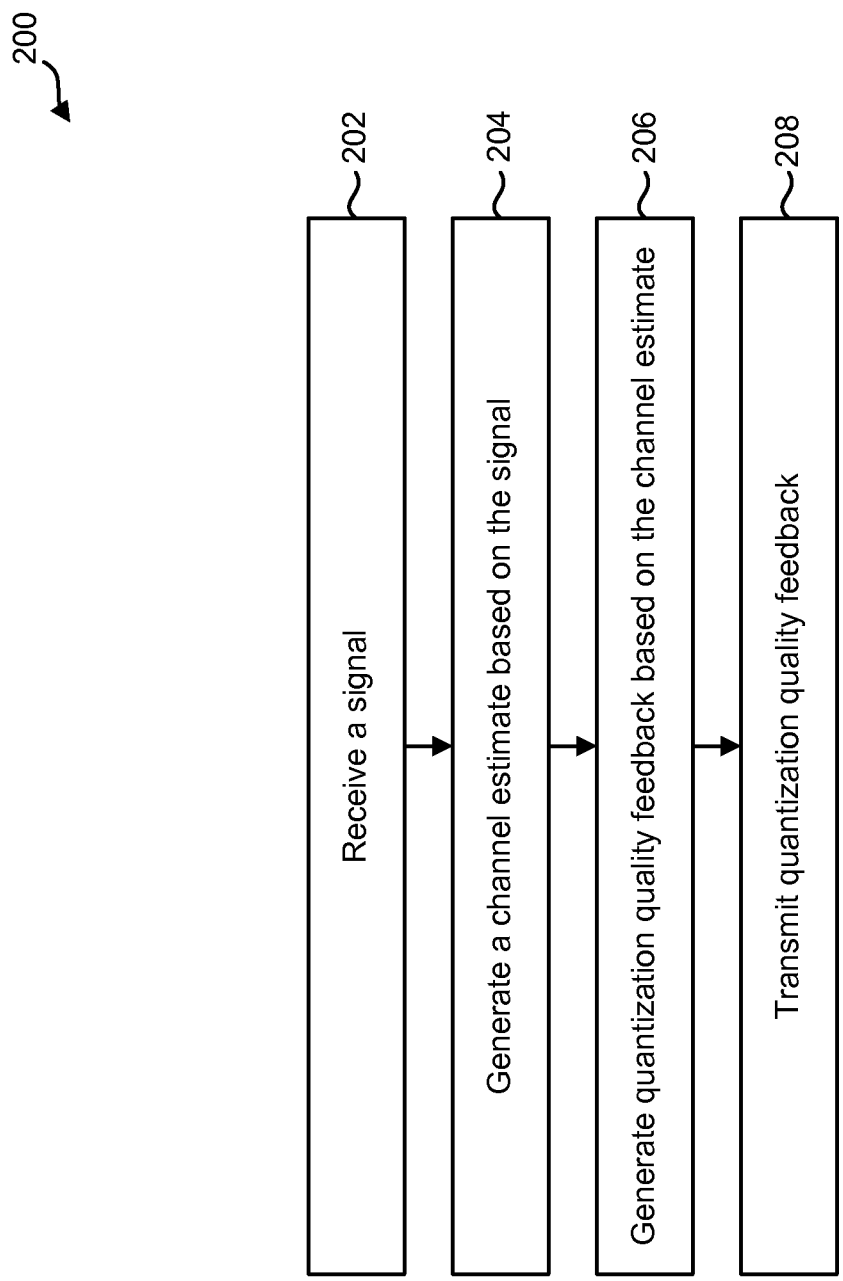
FIG. 2 is a flow diagram illustrating one configuration of a method for sending quantization quality feedback by a wireless communication device.

FIG. 2 is a flow diagram illustrating one configuration of a method 200 for sending quantization quality feedback 110b by a wireless communication device 116. A receiver 118 of the wireless communication device 116 (e.g., user equipment) may receive 202 a signal 126. For example, a signal 126 that can be used for channel estimation may be received from a base station 102 (e.g., evolved Node B). The signal 126 may then be provided to the channel estimation block/module 128.

The wireless communication device 116 may generate 204 a channel estimate 130 based on the signal 126. For example, the wireless communication device 116 may generate 204 a channel estimate 130 that may include a measurement of one or more channel properties of the signal 126. Examples of measurements include, but are not limited to channel gain, fading distribution, signal strength, scatter, phase shift, frequency offset, directionality, power decay, etc. The signal 126 may then be provided to the feedback determination block/module 132.

The wireless communication device may generate 206 quantization quality feedback 110b based on the channel estimate. As described above, quantization quality feedback 110b may include a measure of the quality (e.g., the uncertainty, reliability, accuracy and/or fidelity) of the quantized feedback 124. In one configuration, the quantization quality feedback 110b may represent a measure of the similarity between the estimated feedback (e.g., the computed eigen-directions) and the quantized feedback 124. In some configurations, the quantization quality feedback 110b may not be the mathematical difference (e.g., subtraction) between the estimated feedback (e.g., the computed eigen-directions) and the quantized feedback 124. The quantization quality feedback 110b may be generated as described above.

In some configurations, the quantization quality feedback 110b may be based on the channel estimate 130. For example, the wireless communication device 116 may use estimated feedback and quantized feedback 124 to generate the quantization quality feedback 110b. The wireless communication device 116 may use estimated (e.g., "true") eigen-directions and quantized eigen-directions to generate the quantization quality feedback 110b. In this example, the quantization quality feedback 110b may reflect a relationship between the estimated eigen-directions and the quantized eigen-directions. In another example, the wireless communication device 116 may use an estimated precoding matrix and a selected (e.g., "quantized") precoding matrix to generate the quantization quality feedback 110b.

The quantization quality feedback 110b may be based on explicit quantized feedback 124. For example, the quantized feedback 124 may include the explicit quantized feedback 124 (e.g., one or more eigen-directions and/or the codebook entries or indices that indicate one or more eigen-directions). In this example, the feedback determination block/module 132 may generate a metric (e.g., the metric D illustrated in Equation (1)) that measures the quality of the explicit quantized feedback 124. The metric may be transmitted to the base station 102 as the quantization quality feedback 110b.

In another example, the quantized quality feedback 110b may be based on implicit quantized feedback 124. For instance, the quantized feedback 124 may include the implicit quantized feedback 124 (e.g., corresponding to one or more precoding matrix indicators that identify one or more precoding matrices). The feedback determination block/module 132 may generate and compare hypothetical performance values (e.g., channel quality indicators) that correspond to the one or more precoding matrices. In this example, the feedback determination block/module 132 may transmit a ratio of the precoding matrix indicators corresponding to the compared hypothetical performance values and/or a ratio of the hypothetical performance values to the base station 102 as quantization quality feedback 110b.

Additionally or alternatively, the wireless communication device 116 may transmit a metric as quantization quality feedback 110b. In some examples, the metric may be a scalar value that indicates the quality of the quantized feedback 124. For instance, the wireless communication device 116 may send a metric (e.g., the metric D as illustrated in Equation (1) or a quantized version of D) that measures the quality of the quantization of the quantized feedback 124 (e.g., one or more eigen-directions). In another example, the wireless communication device 116 may send a ratio corresponding to the hypothetical performance of one or more precoding matrix indicators. Additionally or alternatively, generating 206 quantization quality feedback 110b may include quantizing the quantization quality feedback 110b. For example, the feedback determination block/module 132 may quantize the metric and provide it to the transmitter 120 for transmission to the base station 102.

The wireless communication device 116 may transmit 208 the quantization quality feedback 110b. For example, the transmitter 120 of the wireless communication device 116 (e.g., user equipment) may transmit 208 the quantization quality feedback 110b associated with the quantized feedback 124 to the base station 102 (e.g., evolved Node B). In some examples, the wireless communication device 116 may also transmit the quantized feedback 124 to the base station 102. In either example, the quantized feedback 124 and/or the quantization quality feedback 110b may be transmitted to the base station 102 as part of a channel state information report.

As described above, multiple instances of quantized feedback 124 and/or quantization quality feedback 110b may be transmitted to the base station 102, for example, when multiple instances of quantized feedback 124 are generated.

In some implementations, transmitting 208 the quantization quality feedback 110, may include preparing quantization quality feedback 110b for transmission. For example, the feedback determination block/module 132 may prepare the quantization quality feedback 110b for transmission by designating the quantization quality feedback 110b to be transmitted, modulating the quantization quality feedback 110b, encoding the quantization quality feedback 110b and/or formatting the quantization quality feedback 110b into a packet.

Figure 3:
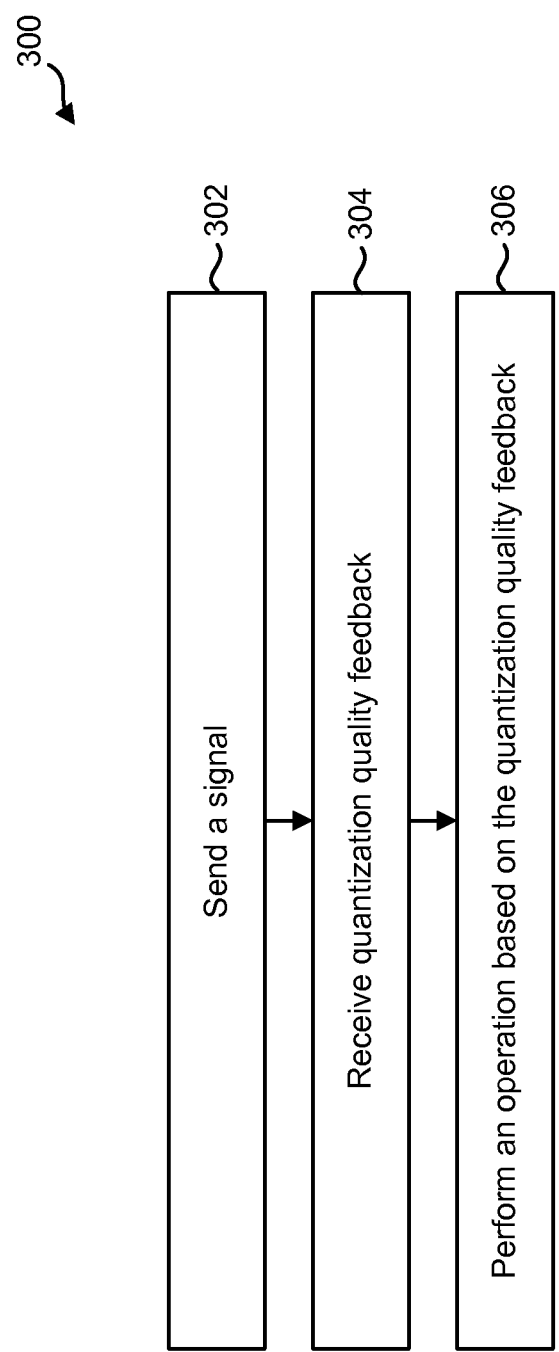
FIG. 3 is a flow diagram illustrating one configuration of a method for receiving quantization quality feedback by a base station.

FIG. 3 is a flow diagram illustrating one configuration of a method 300 for receiving quantization quality feedback 110a by a base station 102. A transmitter 104 of a base station 102 may send 302 a signal 126 to a wireless communication device 116. For example, the base station 102 may send 302 a signal 126 that may be used by a wireless communication device 116 to generate a channel estimate 130. For example, the base station 102 may send 302 one or more pilot signals or other signals that may be utilized by the wireless communication device 116 to generate a channel estimate 130.

The base station 102 may receive 304 quantization quality feedback 110a. For example, the base station 102 may receive a signal that includes quantization quality feedback 110a associated with the quantized feedback 124. Examples of quantization quality feedback 110a may include one or more of the metrics described above. The quantization quality feedback 110a may be based on implicit or explicit quantized feedback 124 as described above. In some implementations, receiving 304 quantization quality feedback 110a may include extracting the quantization quality feedback 110a from a received signal for use by the operations block/module 112. For example, the base station 102 may demodulate, decode, de-scramble, unpack, etc., the received signal to obtain the quantization quality feedback 110a.

In some implementations, receiving 304 quantization quality feedback 110a may include receiving multiple instances of quantization quality feedback 110a. For example, when multiple instances of quantized feedback 124 are generated, the base station 102 may receive quantization quality feedback 110a for each instance of quantized feedback 124. In some instances, the base station 102 may receive 304 the quantization quality feedback 110a as part of a channel state information report. In some implementations, the base station 102 may receive quantized feedback 124. For example, the base station 102 may receive quantized eigen-directions, quantized precoding matrix indicators, quantized channel quality indicators, etc.

The base station 102 may perform 306 one or more operations based on the quantization quality feedback 110a. For example, the operations block/module 112 may determine the modulation and coding scheme for a communication channel with the wireless communication device 116. Examples of modulation schemes include binary phase shift keying (BPSK), quadrature phase shift keying (QPSK), multiple phase shift keying (M-PSK), quadrature amplitude modulation (QAM) and multi-level quadrature amplitude modulation (M-QAM). As described above, the operations block/module 112 may also schedule wireless communications. In some implementations, scheduling may include grouping one or more wireless communication devices 116 based on quantization quality feedback 110a. For example, the operations block/module 112 may schedule wireless communication devices 116 with good quantization quality feedback 110a over wireless communication devices 116 with poor quantization quality feedback 110a. In another example of scheduling, the operations block/module 112 may select a transmission format based on the quantization quality feedback 110a. For example, a wireless communication device 116 with poor quantization quality feedback 110a may be assigned a different transmission format (e.g., single user multiple input and multiple output), than a wireless communication device 116 with good quantization quality feedback 110a (e.g., multi-user multiple input and multiple output).

Other examples of operations that the base station 102 may perform 306 include extrapolating the quantization quality feedback 110a (for example, to aid in transmit interference nulling), predicting and/or selecting communication rate, selecting a transmission beam, adapting the communication link, assessing communication interference, suppressing communication interference, nulling and co-scheduling for use in communications with one or more wireless communication devices 116. One or more of these operations may be performed as described above.

In some configurations, the operations block/module 112 may provide control information 114 to the transmitter 104 for transmission to one or more wireless communication devices 116. The control information 114 may indicate communication control information, such as modulation, coding, wireless communication device grouping assignments, scheduling, rate, etc., which may be used by one or more wireless communication devices 116 to send data to and/or receive data from the base station 102.

Figure 4:
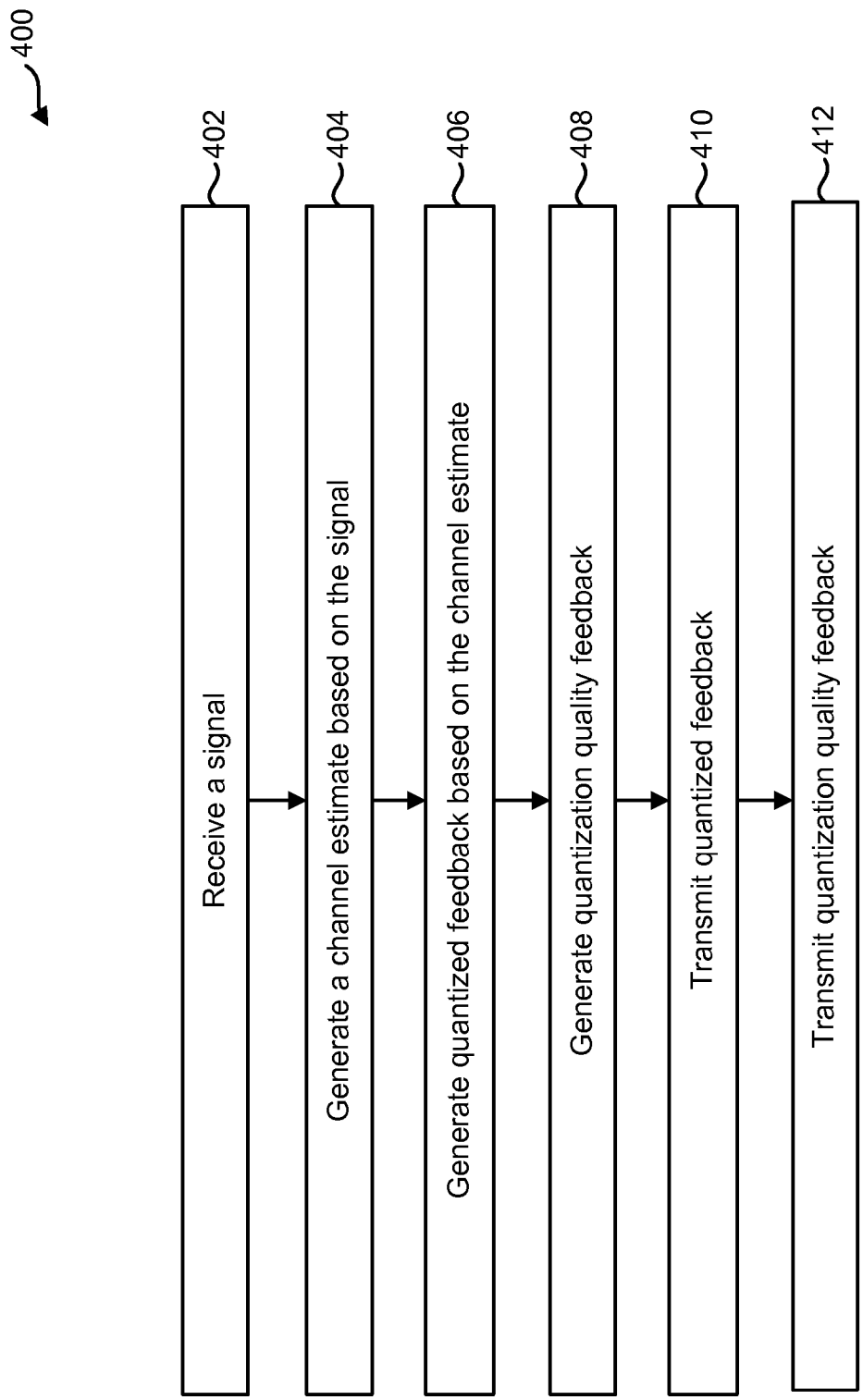
FIG. 4 is a flow diagram illustrating another configuration of a method for sending quantization quality feedback by a wireless communication device.

FIG. 4 is a flow diagram illustrating another configuration of a method 400 for sending quantization quality feedback 110b by a wireless communication device 116. In some approaches, the wireless communication device 116 may receive 402 a signal 126. In some implementations, this may be done as described in connection with FIG. 2.

The wireless communication device 116 may generate 404 a channel estimate 130 based on the signal 126. In some implementations, this may be done as described in connection with FIG. 2.

The wireless communication device 116 may generate 406 quantized feedback 124 based on the channel estimate 130. Examples of quantized feedback 124 include quantized eigen-direction vectors, codebook entry indicators, quantized precoding matrices, precoding matrix indicators, channel quality indicators and rank indicators. In some implementations, the wireless communication device 116 may generate multiple instances of quantized feedback 124, for example corresponding to multiple estimated eigen-directions.

In some implementations, the quantized feedback 124 may be based on explicit feedback. For example, the quantized feedback 124 may include one or more quantized eigen-directions. In some implementations, the feedback determination block/module 132 may generate 406 the quantized feedback 124 (e.g., the eigen-directions) based on a codebook.

Additionally or alternatively, the quantized feedback 124 may be based on implicit feedback. For example, the quantized feedback 124 may include one or more precoding matrix indicators, hypothetical performance values (e.g., channel quality indicators) of one or more precoding matrices or indices that identify the precoding matrices. In some examples, the hypothetical performance values of the one or more precoding matrices may indicate the communication capacity under one or more precoding matrices.

In some configurations, the feedback determination block/module 132 may generate 406 quantized feedback 124 based on a metric. For example, the feedback determination block/module 132 may generate one or more hypothetical performance values associated with one or more precoding matrices. Based on these hypothetical performance values, the feedback determination block/module 132 may generate quantized feedback 124 (e.g., one or more precoding matrices). In another example, the feedback determination block/module 132 may generate a metric (e.g., the metric D in Equation (1)) for measuring the quality of the quantized feedback 124 (e.g., one or more quantized eigen-directions). Based on this metric, the feedback determination block/module 132 may generate quantized feedback 124 that maximizes the metric.

The wireless communication device 116 may generate 408 quantization quality feedback 110b. In some implementations, this may be done as described in connection with FIG. 2.

The wireless communication device 116 may transmit 410 the quantized feedback 124 to the base station 102. In some examples, the quantized feedback 124 may be transmitted to the base station 102 as part of a channel state information report. As described above, multiple instances of quantized feedback 124 may be transmitted to the base station 102.

In some implementations, transmitting 410 the quantized feedback 124 may include preparing the quantized feedback 124 for transmission. For example, the feedback determination block/module 132 may prepare the quantized feedback 124 for transmission by designating the quantized feedback 124 to be transmitted, modulating the quantized feedback 124, encoding the quantized feedback 124 and/or formatting the quantized feedback 124 into a packet. The wireless communication device 116 may transmit 412 the quantization quality feedback 110b. In some implementations, this may be done as described in connection with FIG. 2.

Figure 5:
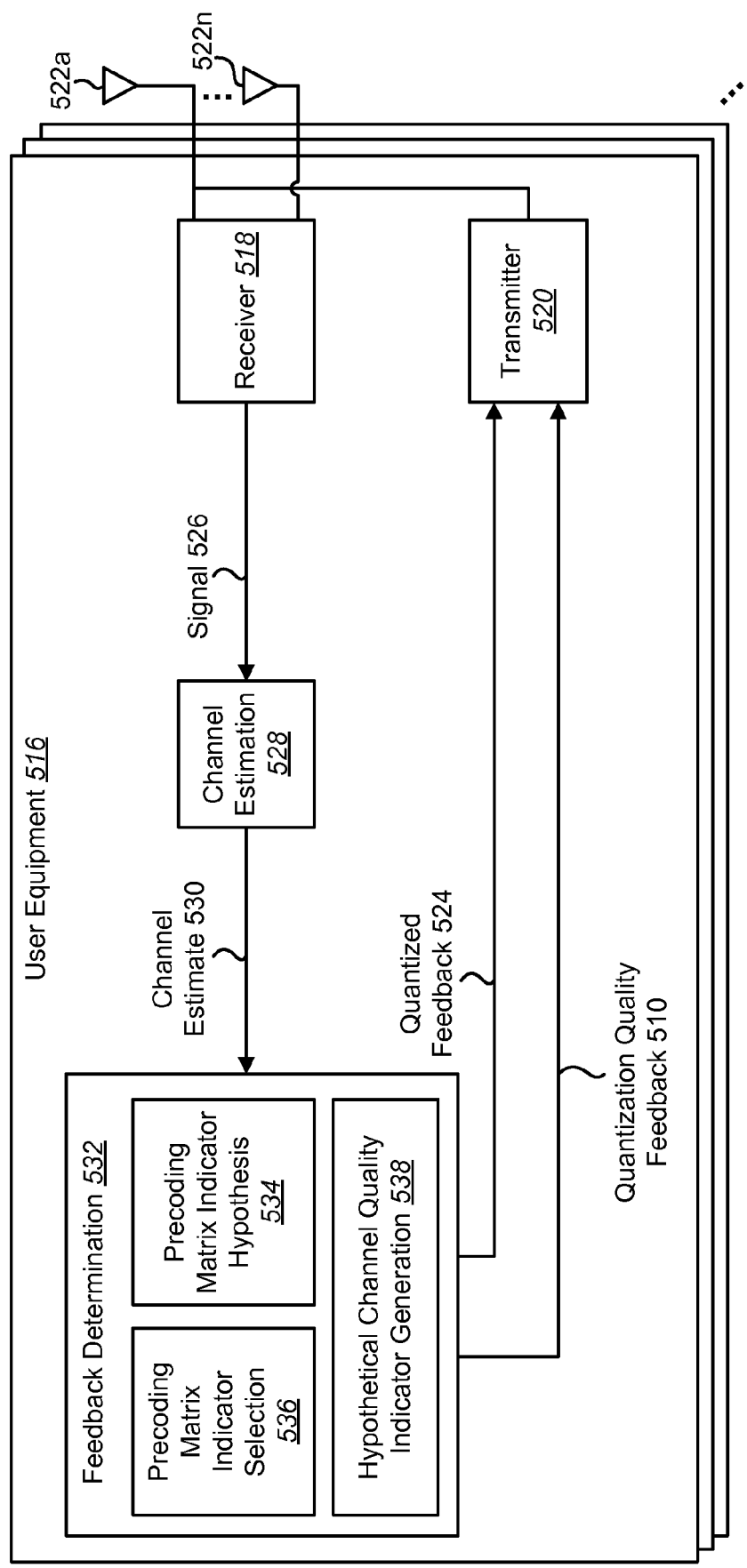
FIG. 5 is a block diagram illustrating one configuration of a user equipment (UE) that may be used to send quantization quality feedback and may be used in accordance with the systems and methods disclosed herein.

FIG. 5 is a block diagram illustrating one configuration of a user equipment 516 that may be used to send quantization quality feedback 110b and may be used in accordance with the systems and methods disclosed herein. The user equipment 516 may be an example of the wireless communication device 116 described in connection with FIG. 1. The user equipment 516 may include a transmitter 520, a receiver 518, one or more antennas 522a-n, a channel estimation block/module 528 and/or a feedback determination block/module 532 similar to corresponding elements described in connection with FIG. 1.

In some implementations, the receiver 518 may provide a signal 526, similar to the signal 126 described previously, to the channel estimation block/module 528. The channel estimation block/module 528 may generate a channel estimate 530, similar to the channel estimate 130 described previously.

The feedback determination block/module 532 may include a precoding matrix indicator hypothesis block/module 534. The precoding matrix indicator hypothesis block/module 534 may include one or more precoding matrix indicator hypotheses. The one or more precoding matrix indicator hypotheses may indicate one or more precoding matrices that represent a number of precoding arrangements for a communication channel. These precoding arrangements may be based on one or more communication channel properties. From these one or more precoding matrix indicator hypotheses, the feedback determination block/module 532 may select a precoding matrix indicator to transmit to the base station 102 as quantized feedback 524.

The feedback determination block/module 532 may include a hypothetical channel quality indicator generation block/module 538. The hypothetical channel quality indicator generation block/module 538 may include and/or generate one or more hypothetical channel quality indicators that indicate the quality of communication of a channel. In some examples, a particular hypothetical channel quality indicator may indicate the quality of a communication channel based on a precoding matrix and the channel estimate 530.

A precoding matrix indicator selection block/module 536 may select one or more precoding matrix indicators from the precoding matrix indicator hypothesis block/module 534. The precoding matrix indicator selection block/module 536 may base the selection of the precoding matrix indicators on the channel estimate 130. For example, the precoding matrix indicator selection block/module 536 may select one or more precoding matrix indicators that maximize communication capacity. In some implementations, the precoding matrix indicator selection block/module 536 may use a metric (e.g., the hypothetical channel quality indicator) to determine the communication capacity.

More specifically, in an example, the precoding matrix indicator selection block/module 536 may select two precoding matrix indicator hypotheses with the best hypothetical channel quality indicators. One or more of the precoding matrix indicators and/or the hypothetical channel quality indicators may then be transmitted as quantized feedback 524. In some configurations, only one precoding matrix indicator/channel quality indicator combination or pair may be sent as quantized feedback 524 (while the quantization quality feedback 510 may be separate, for example). Also, a ratio of one or more precoding matrix indicators and/or a ratio of one or more hypothetical channel quality indicators may be transmitted as quantization quality feedback 510. In some configurations, for example, a ratio of two channel quality indicators (corresponding to the best two precoding matrix indicators, for instance) may be transmitted as quantization quality feedback 510.

In these examples, the one or more selected precoding matrix indicators may be transmitted to the base station 102 as quantized feedback 524, similar to the quantized feedback 124 described previously. Additionally or alternatively, the hypothetical channel quality indicators corresponding to the one or more selected precoding matrix indicators may be transmitted to the base station 102 as quantized feedback 524. The base station 102 may use the hypothetical channel quality indicators to establish a communication channel.

In some implementations, the feedback determination block/module 532 may generate quantization quality feedback 510 based on the one or more selected precoding matrix indicators and/or the one or more corresponding hypothetical channel quality indicators. For example, the user equipment 516 may generate quantization quality feedback 510 based on a comparison of the one or more hypothetical channel quality indicators.

An example of generating quantization quality feedback 510 based on a comparison of the precoding matrix indicators is given as follows. The precoding matrix indicator selection block/module 536 may select one or more precoding matrix indicators. The precoding matrix indicator selection block/module 536 may then compare the corresponding hypothetical channel quality indicators. The precoding matrix indicator selection block/module 536 may then create a ratio of the precoding matrix indicators. This ratio may indicate how close the quality of communication may be under the one or more selected precoding matrix hypotheses. In some implementations, the precoding matrix indicators used to create the ratio may be based on the hypothetical channel quality indicators. For example, the precoding matrix indicator selection block/module 536 may create a ratio of the precoding matrix indicators with the best and second best hypothetical channel quality indicators. This ratio may be transmitted to the base station 102 as quantization quality feedback 510. As described previously, the base station 102 may then perform operations based on this feedback.

Figure 6:
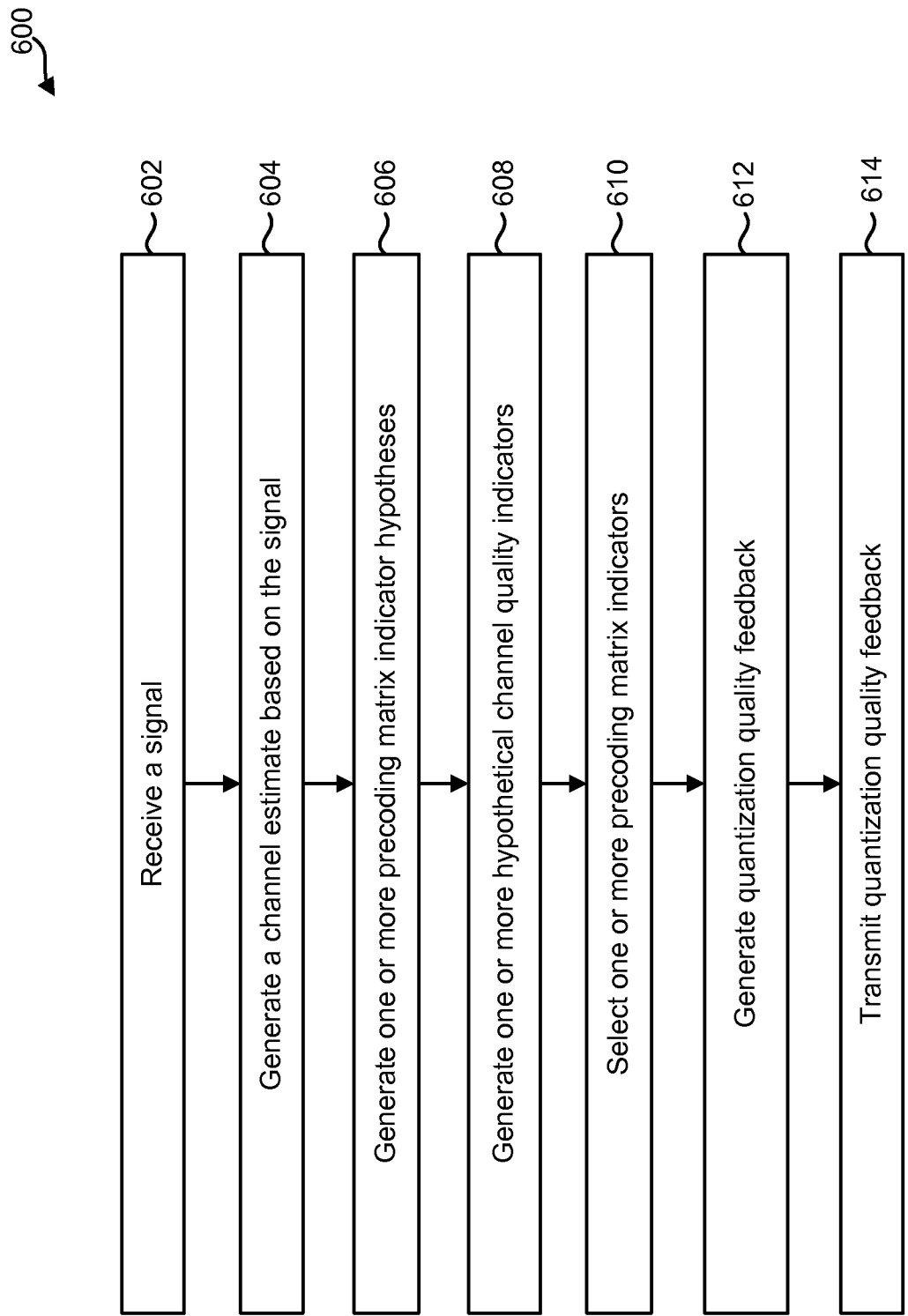
FIG. 6 is a flow diagram illustrating a configuration of a method for sending quantization quality feedback by a user equipment.

FIG. 6 is a flow diagram illustrating a configuration of a method 600 for sending quantization quality feedback 510 by a user equipment 516. In some approaches, the user equipment 516 may receive 602 a signal 526. In some implementations, this may be done as described in FIG. 2.

The user equipment 516 may generate 604 a channel estimate 530 based on the signal 526. In some implementations, this may be done as described in connection with FIG. 2.

The user equipment 516 may generate 606 one or more precoding matrix indicator hypotheses. As described above, the one or more precoding matrix indicator hypotheses may indicate one or more precoding matrices that represent different precoding arrangements for a communication channel. In some implementations, the precoding matrix indicator hypotheses may be obtained from another computing device (e.g., the base station 102).

The user equipment 516 may generate 608 one or more hypothetical channel quality indicators. As described above, the hypothetical channel quality indicators indicate the quality of communication of a channel. In some examples, a particular hypothetical channel quality indicator indicates the quality of communication based on a particular precoding matrix and the channel estimate 530. In some implementations, the user equipment 516 may generate 608 one or more hypothetical channel quality indicators based on the one or more precoding matrix indicator hypotheses and the channel estimate 530. For example, the user equipment 516 may determine the communication properties of the channel estimate 530 under the one or more precoding matrix indicator hypotheses. In this example, the user equipment 516 may use the communication properties under the one or more precoding matrix indicator hypotheses to generate 608 the one or more hypothetical channel quality indicators. In some implementations, the one or more hypothetical channel quality indicators may be scalar values that indicate the performance of the communication channel based on a particular precoding matrix and the channel estimate 530.

The user equipment 516 may select 610 one or more precoding matrix indicators. The selection may be based on the hypothetical channel quality indicators. For example, the user equipment 516 may select one or more precoding matrix indicators with good corresponding hypothetical channel quality indicators. In some implementations, the one or more selected precoding matrix indicators and/or the corresponding hypothetical channel quality indicators may be transmitted to the base station 102 as quantized feedback 524.

The user equipment 516 may generate 612 quantization quality feedback 510. In some implementations, the user equipment 516 may generate 612 quantization quality feedback based on the one or more precoding matrix indicators. For example, the user equipment 516 may compare the hypothetical channel quality indicators of one or more of the selected precoding matrix indicators. In some implementations, the comparison could result in a scalar value (e.g., the ratio of the precoding matrix indicators) that indicates the quality of the quantized feedback 524. This ratio may be included in the quantization quality feedback 510. As described above, the base station 102 may perform operations based on this feedback.

The user equipment 516 may transmit 614 the quantization quality feedback 510. In some implementations, this may be done as described in connection with FIG. 2.

Figure 7:
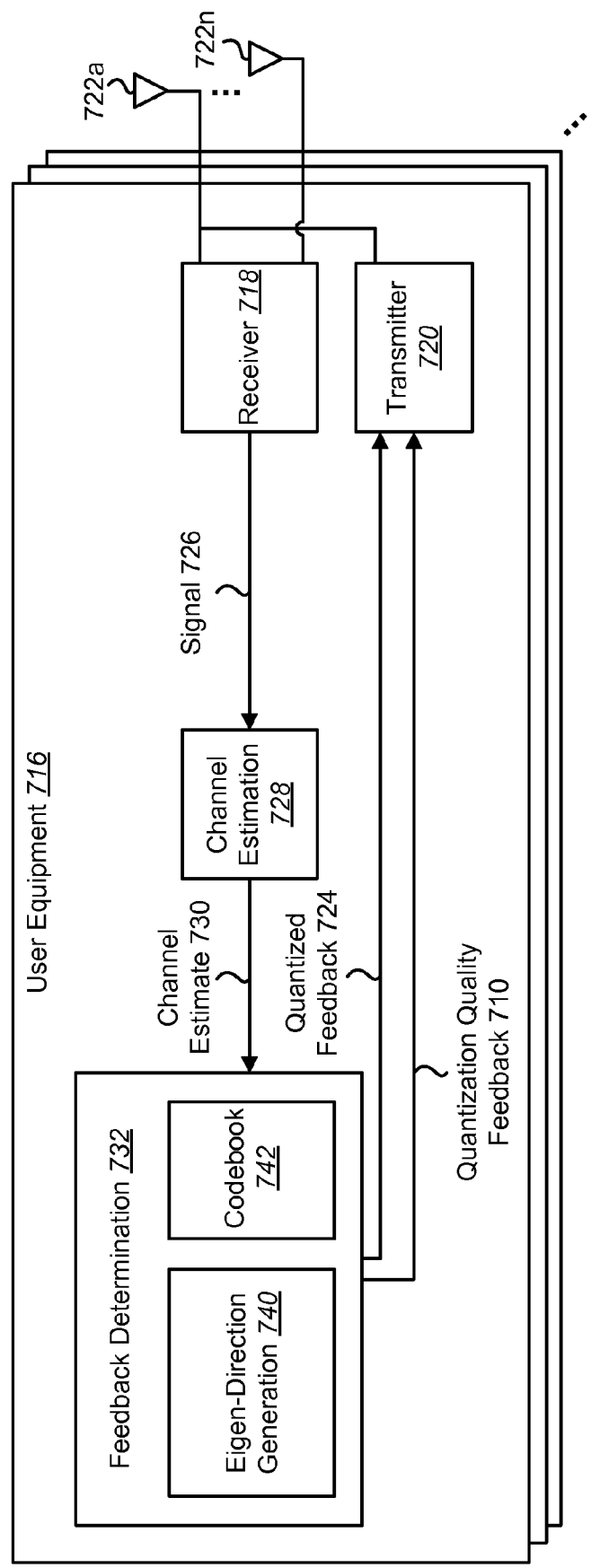
FIG. 7 is a block diagram illustrating another configuration of a user equipment that may be used to send quantization quality feedback and may be used in accordance with the systems and methods disclosed herein.

FIG. 7 is a block diagram illustrating one configuration of a user equipment 716 that may be used to send quantization quality feedback 710 and may be used in accordance with the systems and methods disclosed herein. The user equipment 716 may be an example of the wireless communication device 116 described in connection with FIG. 1. Additionally, the user equipment 716 may be similar to the user equipment 516 described in connection with FIG. 5. The user equipment 716 may include a transmitter 720, a receiver 718, one or more antennas 722*a-n*, a channel estimation block/module 728 and/or a feedback determination block/module 732 similar to corresponding elements described in connection with FIG. 1.

In some implementations, the receiver 718 may provide a signal 726, similar to the signal 126 described previously, to the channel estimation block/module 728. The channel estimation block/module 728 may generate a channel estimate 730, similar to the channel estimate 130 described previously.

In some implementations, the feedback determination block/module 732 may include a codebook 742. The feedback determination block/module 732 may generate quantized feedback 724 and quantization quality feedback 710 based on the codebook 742. For example, the feedback determination block/module 732 may quantize one or more eigen-directions based on a codebook 742 entry.

An eigen-direction generation block/module 740 may generate one or more non-quantized eigen-directions. The non-quantized eigen-directions may be based on the channel estimate 730. For example, the eigen-direction generation block/module 740 may perform a singular value decomposition on the channel estimate 730 to generate a non-quantized eigen-direction.

The eigen-direction generation block/module 740 may generate quantized eigen-directions. The quantized eigen-directions may be generated based on a metric that indicates the quality of the quantization. In some implementations, the quantized eigen-directions may be based on a codebook 742. For example, the eigen-direction generation block/module 740 may quantize the eigen-directions based on a codebook 742 entry that maximizes the metric (e.g., the metric D illustrated in Equation (1)).

In some implementations, the quantized eigen-directions may be transmitted to the base station 102 as quantized feedback 724. In the case of multiple estimated eigen-directions, the eigen-direction generation block/module 740 may generate multiple instances of quantized eigen-directions as quantized feedback 724.

The eigen-direction generation block/module 740 may generate quantization quality feedback 710 based on the one or more quantized eigen-directions. For example, a metric that measures the quality of the quantized feedback 724 (e.g., the quantization of the one or more eigen-directions) may be transmitted to the base station 102 as quantization quality feedback 710. In some implementations, the eigen-direction generation block/module 740 may quantize the quantization quality feedback 710 (e.g., the metric) before transmitting it to the base station 102. In the case of multiple eigen-directions, the eigen-direction generation block/module 740 may generate multiple instances of quantization quality feedback 710 that correspond to the multiple quantized eigen-directions.

Figure 8:
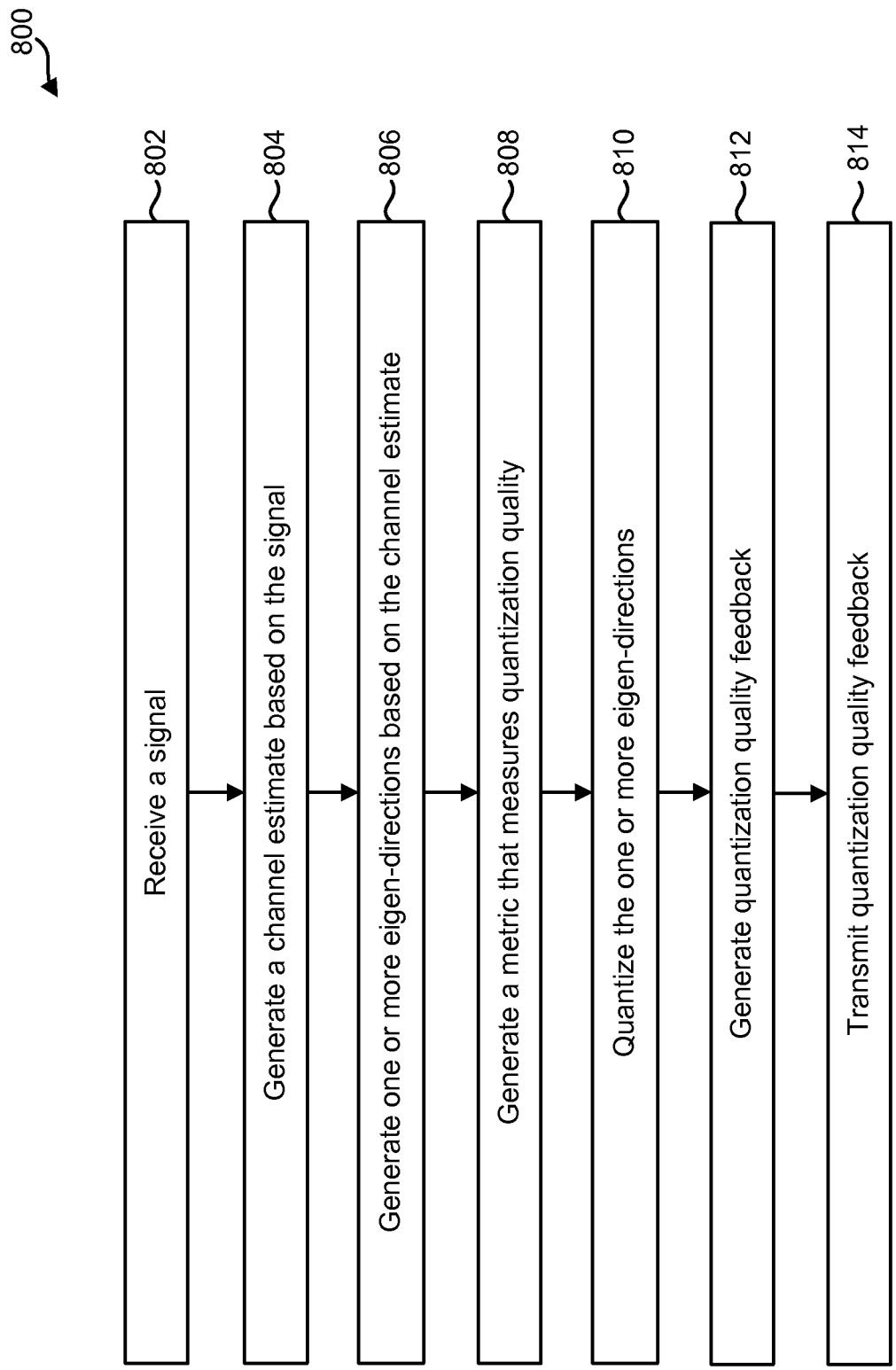
FIG. 8 is a flow diagram illustrating another configuration of a method for sending quantization quality feedback by a user equipment.

FIG. 8 is a flow diagram illustrating another configuration of a method 800 for sending quantization quality feedback 710 by a user equipment 716. In some approaches, the user equipment 716 may receive 802 a signal 726. In some implementations, this may be done as described in FIG. 2.

The user equipment 716 may generate 804 a channel estimate 730 based on the signal 726. In some implementations, this may be done as described in connection with FIG. 2.

The user equipment 716 may generate 806 one or more eigen-directions based on the channel estimate 730. In some implementations, the user equipment 716 may perform a singular value decomposition of the channel estimate 730 to generate 806 the one or more eigen-directions.

The user equipment 716 may generate 808 a metric that measures the quantization quality. For example, the metric may indicate the quality (e.g., the uncertainty, reliability and/or fidelity) of the communication channel based on the quantized feedback 724 (e.g., one or more quantized eigen-directions). As described above, the metric may be transmitted to the base station 102 as quantization quality feedback 710. As such, the quantization quality feedback 710 (e.g., the metric) may indicate the reliability of the quantized feedback, from which the base station 102 may perform operations. In some implementations, the metric may be a scalar value that measures the quality of quantization, for example the metric D from Equation (1).

The user equipment 716 may quantize 810 the one or more eigen-directions. As described above, the user equipment 716 may quantize 810 the one or more eigen-directions based on the codebook 742, for example, based on a particular entry in the codebook 742. In some configurations, the user equipment 716 may base the quantization on the metric that measures quantization quality. For example, the user equipment 716 may quantize the one or more eigen-directions using a codebook 742 entry that maximizes the metric (e.g., the metric D from Equation (1)).

The user equipment 716 may generate 812 quantization quality feedback 710. In some implementations, the user equipment 716 may generate 812 quantization quality feedback based on the metric. For example, the user equipment 716 could transmit the metric as quantization quality feedback 710. According to some approaches, the user equipment 716 may quantize the metric, and transmit the metric as quantized quantization quality feedback 710.

The user equipment 716 may transmit 814 the quantization quality feedback 710. In some implementations, this may be done as described in connection with FIG. 2.

Figure 9:
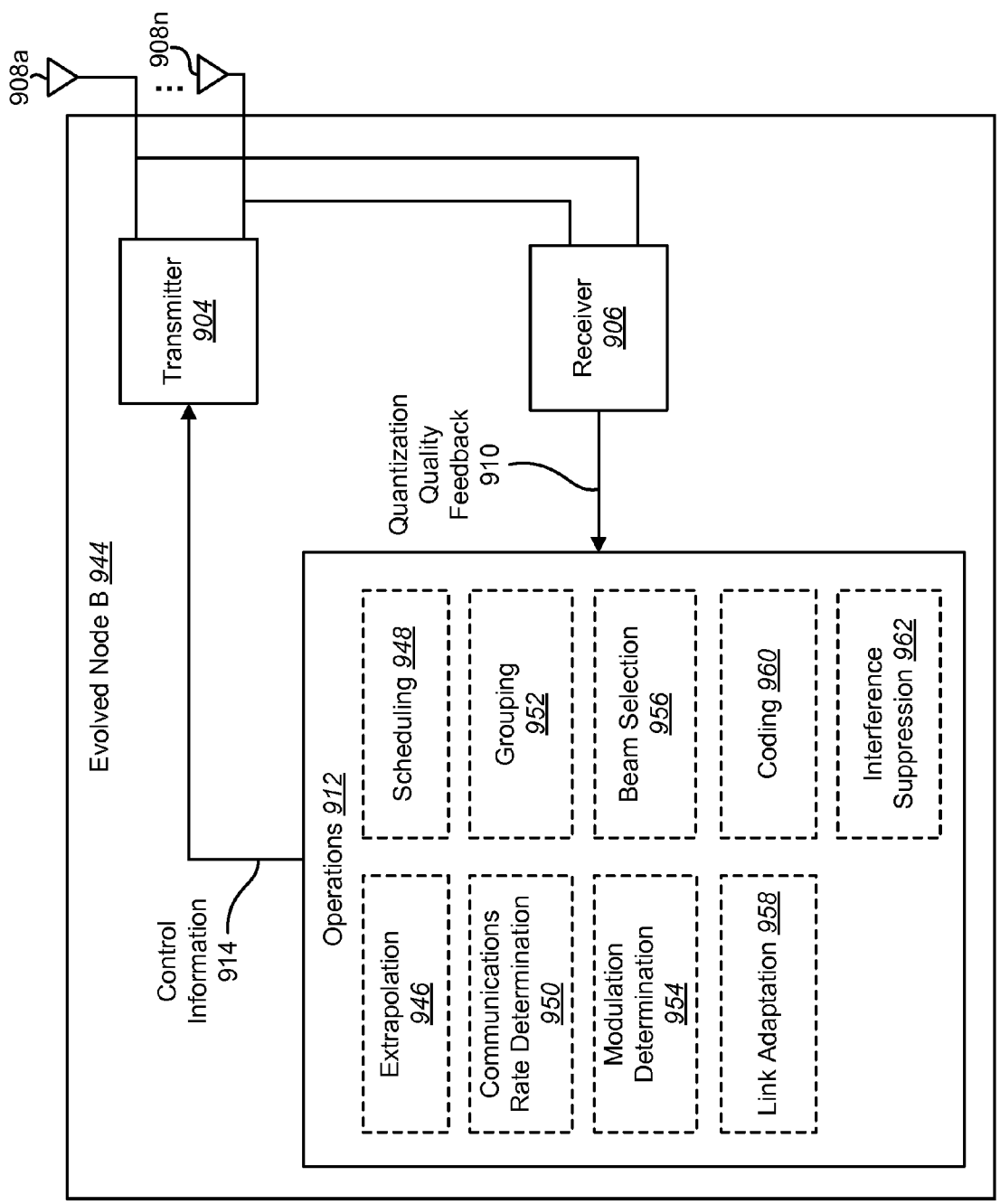
FIG. 9 is a block diagram illustrating one configuration of an evolved Node B (eNB) that may be used to receive quantization quality feedback and may be used in accordance with the systems and methods disclosed herein.

FIG. 9 is a block diagram illustrating one configuration of an evolved Node B 944 that may be used to receive quantization quality feedback 910 and may be used in accordance with the systems and methods disclosed herein. The evolved Node B 944 may be an example of the base station 102 described previously in connection with FIG. 1. The evolved Node B 944 may include a transmitter 904, a receiver 906, one or more antennas 908a-n and/or an operations block/module 912 similar to corresponding elements described above in connection with FIG. 1. As described above, the evolved Node B 944 may receive the quantization quality feedback 910, similar to the quantized quality feedback 110a described previously, through the receiver 906. The quantization quality feedback 910 may be provided to the operations block/module 912.

The operations block/module 912 may include one or more blocks/modules that perform operations based on the quantization quality feedback 910. For example, a modulation determination block/module 954 may determine the modulation format for a communication channel between the evolved Node B 944 and another wireless communication device 116 (e.g., user equipment 716). Examples of modulation schemes include binary phase shift keying, quadrature phase shift keying, multiple phase shift keying, quadrature amplitude modulation and multi-level quadrature amplitude modulation. A coding block/module 960 may determine the coding format for a communication channel between the evolved Node B 944 and another wireless communication device 116.

A communication rate determination block/module 950 may determine the communication rate between the evolved Node B 944 and a wireless communication device 116 (e.g., the user equipment 716). For example, the communication rate determination block/module 950 may determine a slower communication rate for a communication channel with poor quantization quality feedback 910.

A scheduling block/module 948 may schedule wireless communications. For example, wireless communication devices 116 with good quantization quality feedback 910 may be scheduled over wireless communication devices 116 with poor quantization quality feedback 910. The scheduling block/module 948 may also allocate resources to a communication channel. Examples of resources that may be allocated by the scheduling block/module 948 include, but are not limited to time slots, frequency sub-bands, spatial streams, etc.

A grouping block/module 952 may categorize one or more wireless communication devices 116 based on the quantization quality feedback 910. For example, the grouping block/module 952 may group together wireless communication devices 116 with good quantization quality feedback 910. Similarly, the grouping block/module 952 may group together wireless communication devices 116 with poor quantization quality feedback 910.

A link adaptation block/module 958 may adapt the communication link between the evolved Node B 944 and the wireless communication device 116 based on the quantization quality feedback 910. For example, the link adaptation block/module 958 may adapt one or more of communication rate, modulation, coding, error control coding, etc.

A beam selection block/module 956 may select a communication beam (e.g., beam directionality) based on the quantization quality feedback 910. An interference suppression block/module 962 may assess interference based on the quantization quality feedback 910. For example, the interference suppression block/module 962 may assess the interference of one or more signals. The interference suppression block/module 962 may also suppress the interference created by the different signals.

In some configurations, an extrapolation block/module 946 may extrapolate information based on the quantization quality feedback 910. For example, the extrapolation block/module 946 may extrapolate a channel quality indicator based on the quantization quality feedback 910 received from a wireless communication device 116 to assist in interference suppression and/or nulling. In some implementations, the operations block/module 912 may provide control information 914, similar to control information 114, to the transmitter 904 for transmission to one or more user equipments 716.

Figure 10:
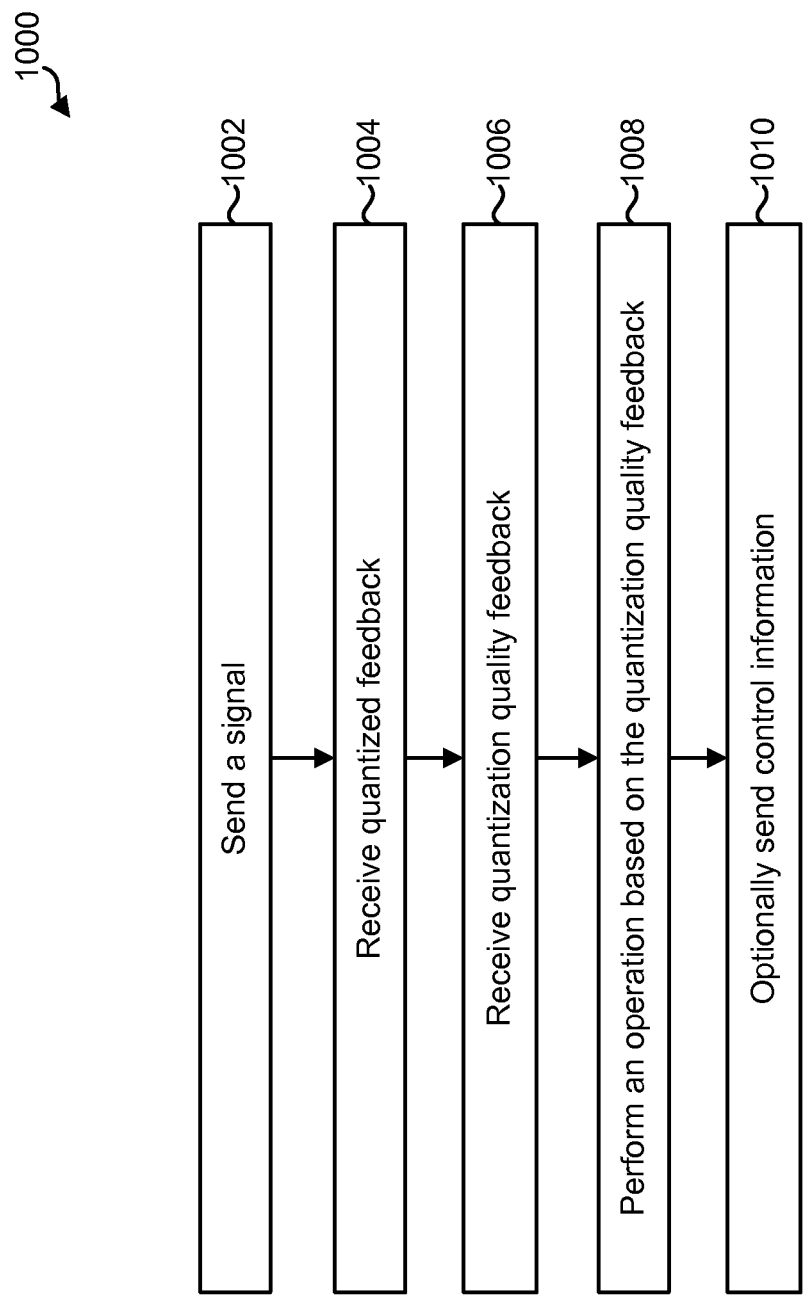
FIG. 10 is a flow diagram illustrating a configuration of a method for receiving quantization quality feedback by an evolved Node B.

FIG. 10 is a flow diagram illustrating a configuration of a method 1000 for receiving quantization quality feedback 910 by an evolved Node B 944. In some approaches, the evolved Node B 944 may send 1002 a signal 126. In some implementations, this may be done as described in connection with FIG. 3.

The evolved Node B 944 may receive 1004 the quantized feedback. As described above, the quantized feedback may be based on explicit or implicit feedback. Examples of quantized feedback include quantized eigen-directions, quantized precoding matrices, precoding matrix indicators, hypothetical channel quality indicators, etc. In some instances, the evolved Node B 944 may receive 1004 multiple instances of quantized feedback, for example corresponding to multiple instances of estimated feedback (e.g., non-quantized eigen-directions). Receiving 1004 the quantized feedback 124 may include extracting the quantized feedback from a received signal for use by the operations block/module 912. For example, the evolved Node B 944 may demodulate, decode, de-scramble, unpack, etc., the received signal to obtain the quantization quality feedback 910. According to some configurations, the evolved Node B 944 may receive 1004 the quantized feedback as part of a channel state information report.

The evolved Node B 944 may receive 1006 quantization quality feedback 910. In some implementations, this may be done as described in connection with FIG. 3.

The evolved Node B 944 may perform 1008 one or more operations based on the quantization quality feedback 910. In some implementations, this may be done as described in connection with FIG. 3.

Optionally, the evolved Node B 944 may send 1010 control information 914. For example, the evolved Node B 944 may send control information 914 to the transmitter 904 for transmission to one or more wireless communication devices 116. As described above, the control information 914 may indicate communication control information, such as modulation, coding, wireless communication device 116 grouping assignments, scheduling, rate, etc., which may be used by one or more wireless communication devices 116 to send data and/or receive data from the evolved Node B 944.

Figure 11:
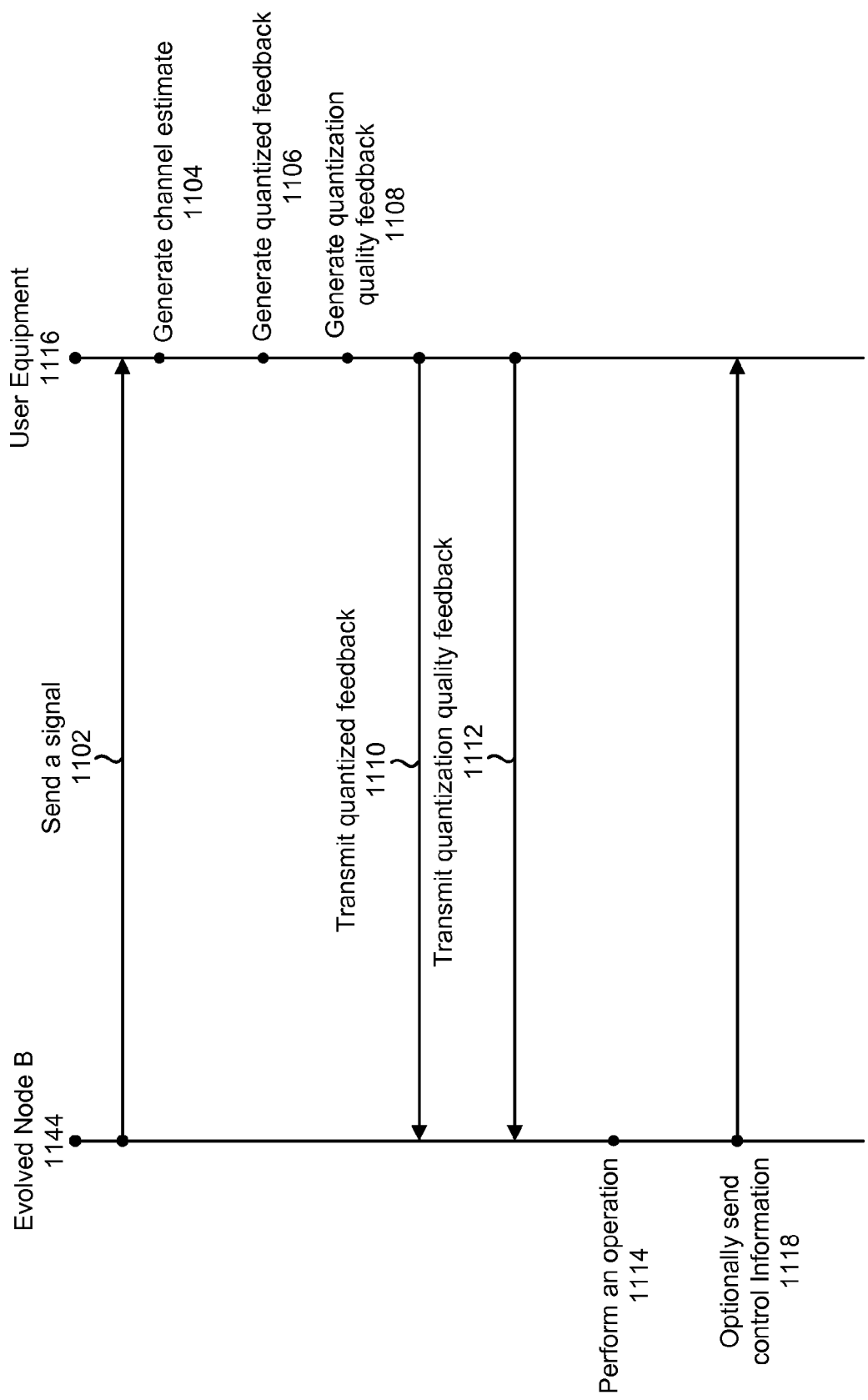
FIG. 11 is a thread diagram illustrating one example of a method for sending and receiving quantization quality feedback by an evolved Node B and a user equipment.

FIG. 11 is a thread diagram illustrating one example of a method for sending and receiving quantization quality feedback 910 by an evolved Node B 1144 and a user equipment 1116. According to some implementations, evolved Node B 1144 and the user equipment 1116 may be similar to corresponding elements described previously in connection with FIGS. 9 and 7 respectively.

In one implementation, evolved Node B 1144 may send 1102 a signal 126 to the user equipment 1116. Based on the signal, the user equipment 1116 may generate 1104 a channel estimate 130 that may include measurements of one or more properties of the communication channel. In some implementations, the user equipment 1116 may generate 1106 quantized feedback 124. In some implementations, the quantized feedback 124 may be based on the channel estimate 130. For example, the user equipment 1116 may perform a singular value decomposition of the channel estimate 130 to generate one or more eigen-directions. The user equipment 1116 may then quantize the one or more eigen-directions to generate quantized feedback 124.

The user equipment 1116 may generate 1108 quantization quality feedback 910. The quantization quality feedback 910 may be a measure of the quality of the quantized feedback 124. For example, the quantization quality feedback 910 may be a metric that indicates the quality of the quantized feedback 124 (e.g., the one or more quantized eigen-directions). The user equipment 1116 may transmit 1110 the quantized feedback 124 to the evolved Node B 1144. Similarly, the user equipment 1116 may transmit 1112 the quantization quality feedback 910 to the evolved Node B 1144. In some instances, the user equipment 1116 may transmit multiple instances of quantized feedback 124 and/or quantization quality feedback 910. This feedback may be transmitted to the evolved Node B 1144 as part of a channel state information report.

Upon receipt, the evolved Node B 1144 may perform 1114 operations based on the quantization quality feedback 910. Optionally, the evolved Node B 1144 may send 1118 control information to the user equipment 1116.

Figure 12:
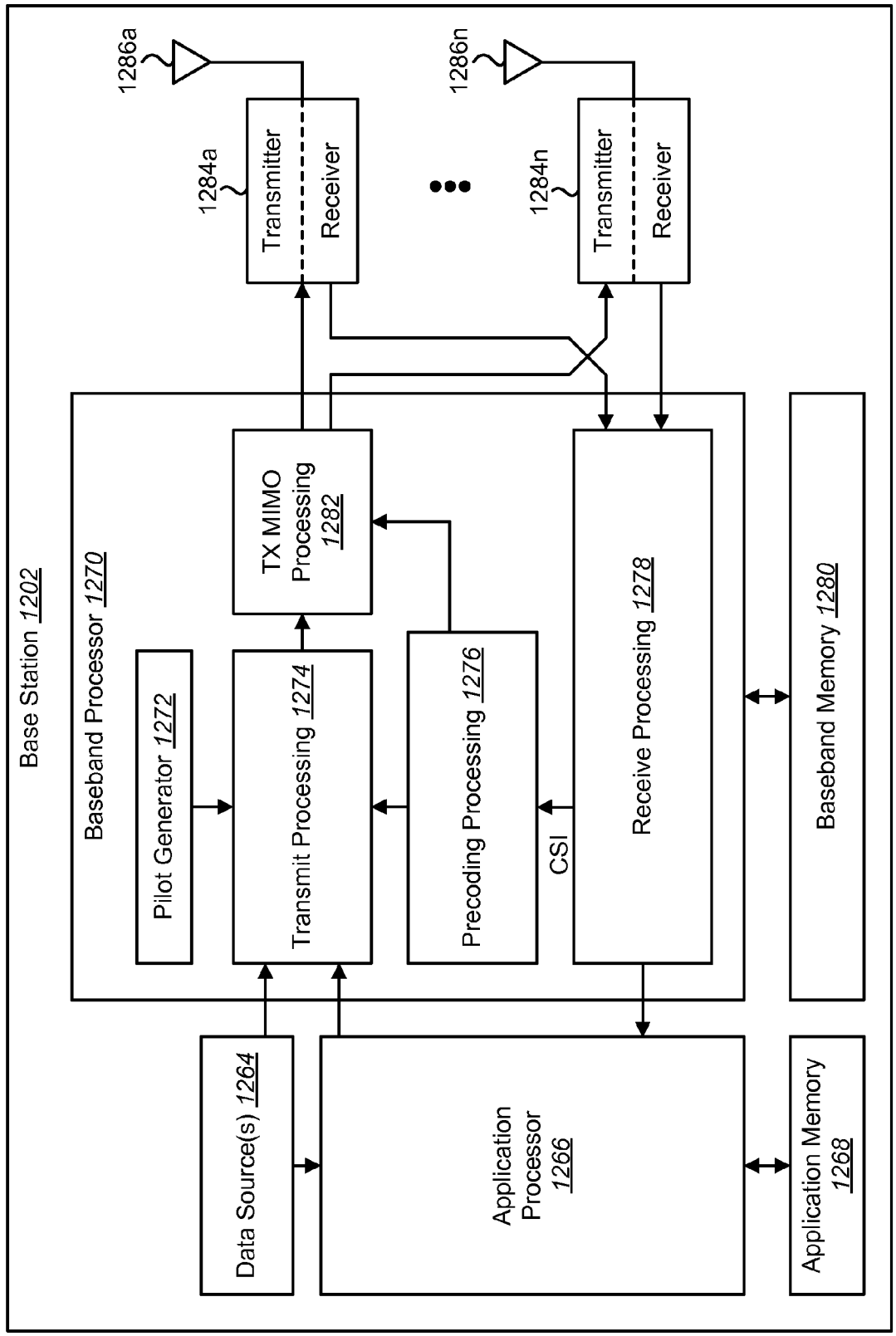
FIG. 12 is a block diagram of a base station that may be used in a multiple input and multiple output (MIMO) system and may be used in accordance with the systems and methods disclosed herein.

FIG. 12 is a block diagram of a base station 1202 that may be used in a multiple input and multiple output system and may be used in accordance with the systems and methods disclosed herein. Examples of the base station 1202 may include one or more of the base station 102 and the evolved Node B 944 described above. In the base station 1202, traffic data (e.g., control information) for a number of data streams is provided from one or more data sources 1264 and/or an application processor 1266 to a baseband processor 1270. In particular, traffic data may be provided to a transmit processing block/module 1274 included in the baseband processor 1270. Each data stream may then be transmitted over a respective transmit antenna 1286a-n. The transmit processing block/module 1274 may format, code and interleave the traffic data for each data stream based on a particular coding scheme selected for that data stream to provide coded data.

The coded data for each data stream may be multiplexed with pilot data from a pilot generator 1272 using orthogonal frequency-division multiplexing (OFDM) techniques. The pilot data may be a known data pattern that is processed in a known manner and used at a receiver to estimate the channel response. The multiplexed pilot and coded data for each stream is then modulated (e.g., symbol mapped) based on a particular modulation scheme (e.g., binary phase shift keying, quadrature phase shift keying, multiple phase shift keying, quadrature amplitude modulation or multi-level quadrature amplitude modulation) selected for that data stream to provide modulation symbols. The data rate, coding and modulation for each data stream may be determined by instructions performed by a processor.

The modulation symbols for data streams may be provided to a transmit (TX) multiple input and multiple output (MIMO) processing block/module 1282, which may further process the modulation symbols (e.g., for orthogonal frequency-division multiplexing). The transmit multiple input and multiple output processing block/module 1282 then provides a number of modulation symbol streams to the transmitters 1284a-n. The transmit multiple input and multiple output processing block/module 1282 may apply beamforming weights to the symbols of the data streams and to the antenna 1286 from which the symbol is being transmitted.

Each transmitter 1284 may receive and process a respective symbol stream to provide one or more analog signals, and further condition (e.g., amplify, filter, and upconvert) the analog signals to provide a modulated signal suitable for transmission over the multiple input and multiple output channel. Modulated signals from the transmitters 1284a-n are then respectively transmitted from the antennas 1286a-n. For example, the modulated signal may be transmitted to a wireless communication device (not illustrated in FIG. 12).

The base station 1202 may receive modulated signals (from a wireless communication device, for example). These modulated signals are received by antennas 1286 and conditioned by receivers 1284 (e.g., filtered, amplified, downconverted, digitized). In other words, each receiver 1284 may condition (e.g., filter, amplify, and downconvert) a respective received signal, digitize the conditioned signal to provide samples, and further process the samples to provide a corresponding "received" symbol stream.

A receive processing block/module 1278 included in the baseband processor 1270 then receives and processes the received symbol streams from the receivers 1284 based on a particular receiver processing technique to provide a number of "detected" streams. The receive processing block/module 1278 demodulates, deinterleaves and decodes each stream to recover the traffic data for the data stream.

A precoding processing block/module 1276 included in the baseband processor 1270 may receive channel state information from the receive processing block/module 1278. The precoding processing block/module 1276 then determines which precoding matrix to use for determining the beamforming weights and then processes the extracted message. It should be noted that the baseband processor 1270 may store information on and retrieve information from baseband memory 1280.

The baseband processor 1270 may perform one or more of the operations based on the quantization quality feedback 110a described above. For example, one or more of the precoding processing block/module 1276, the transmit processing block/module 1274, and the transmit multiple-input multiple-output block/module 1282 may perform one or more of the operations based on quantization quality feedback 110a. Additionally or alternatively, the application processor 1266 may perform one or more of the operations based on quantization quality feedback 110a described above.

The traffic data recovered by the baseband processor 1270 may be provided to the application processor 1266. The application processor 1266 may store information in and retrieve information from the application memory 1268.

Figure 13:
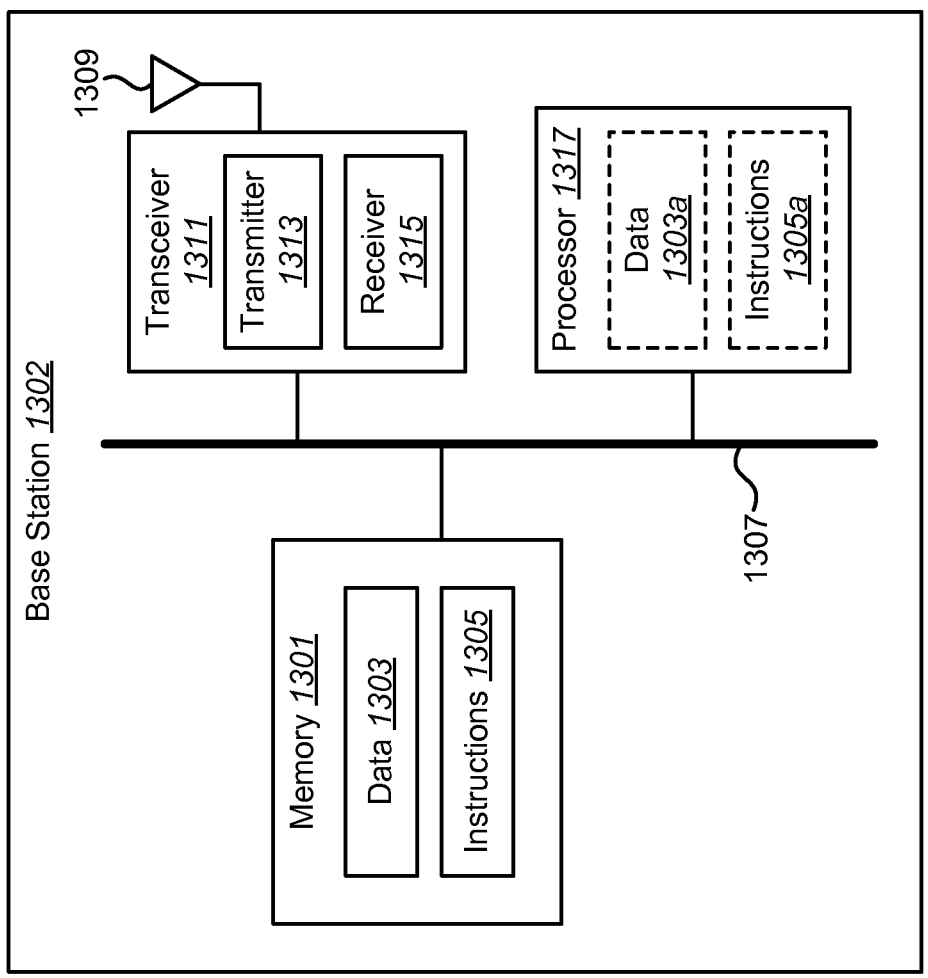
FIG. 13 illustrates certain components that may be included within a base station.

FIG. 13 illustrates certain components that may be included within a base station 1302. One or more of the base stations 102 and evolved Node Bs (eNBs) 944 and 1144 described above may be configured similarly to the base station 1302 that is shown in FIG. 13.

The base station 1302 includes a processor 1317. The processor 1317 may be a general purpose single- or multi-chip microprocessor (e.g., an ARM), a special purpose microprocessor (e.g., a digital signal processor (DSP)), a microcontroller, a programmable gate array, etc. The processor 1317 may be referred to as a central processing unit (CPU). Although just a single processor 1317 is shown in the base station 1302 of FIG. 13, in an alternative configuration, a combination of processors (e.g., an ARM and DSP) could be used.

The base station 1302 also includes memory 1301 in electronic communication with the processor 1317 (i.e., the processor 1317 can read information from and/or write information to the memory 1301). The memory 1301 may be any electronic component capable of storing electronic information. The memory 1301 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1303 and instructions 1305 may be stored in the memory 1301. The instructions 1305 may include one or more programs, routines, sub-routines, functions, procedures, code, etc. The instructions 1305 may include a single computer-readable statement or many computer-readable statements. The instructions 1305 may be executable by the processor 1317 to implement one or more of the methods described above. Executing the instructions 1305 may involve the use of the data 1303 that is stored in the memory 1301. FIG. 13 shows some instructions 1305a and data 1303a being loaded into the processor 1317.

The base station 1302 may also include a transmitter 1313 and a receiver 1315 to allow transmission and reception of signals between the base station 1302 and a remote location (e.g., another transmitting communication device, access terminal, access point, etc.). The transmitter 1313 and receiver 1315 may be collectively referred to as a transceiver 1311. An antenna 1309 may be electrically coupled to the transceiver 1311. The base station 1302 may also include (not shown) multiple transmitters, multiple receivers, multiple transceivers and/or multiple antennas.

The various components of the base station 1302 may be coupled together by one or more buses, which may include a power bus, a control signal bus, a status signal bus, a data bus, etc. For simplicity, the various buses are illustrated in FIG. 13 as a bus system 1307.

Figure 14:
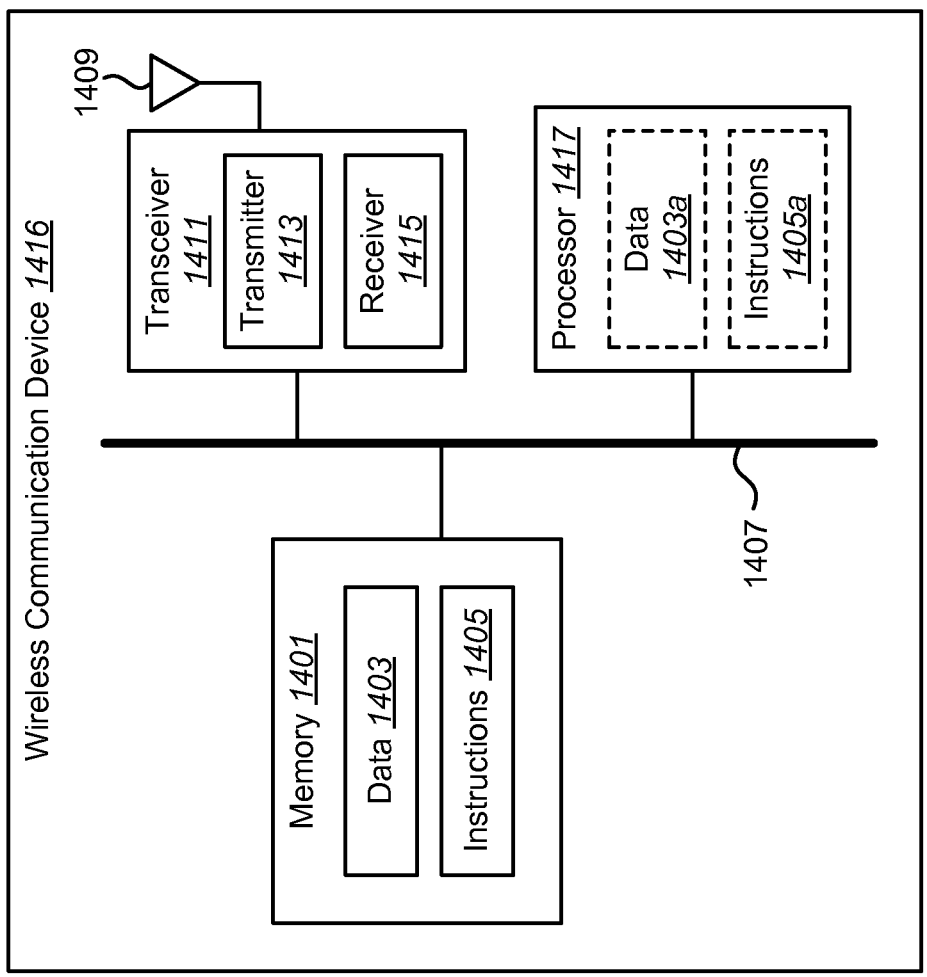
FIG. 14 illustrates certain components that may be included within a wireless communication device.

FIG. 14 illustrates certain components that may be included within a wireless communication device 1416. One or more of the wireless communication devices 116 and the user equipments 516, 716 and 1116 described above may be configured similarly to the wireless communication device 1416 that is shown in FIG. 14.

The wireless communication device 1416 includes a processor 1417. The processor 1417 may be a general purpose single- or multi-chip microprocessor (e.g., an ARM), a special purpose microprocessor (e.g., a digital signal processor (DSP)), a microcontroller, a programmable gate array, etc. The processor 1417 may be referred to as a central processing unit (CPU). Although just a single processor 1417 is shown in the wireless communication device 1416 of FIG. 14, in an alternative configuration, a combination of processors 1417 (e.g., an ARM and DSP) could be used.

The wireless communication device 1416 also includes memory 1401 in electronic communication with the processor 1417 (i.e., the processor 1417 can read information from and/or write information to the memory 1401). The memory 1401 may be any electronic component capable of storing electronic information. The memory 1401 may be random access memory (RAM), read-only memory (ROM), magnetic disk storage media, optical storage media, flash memory devices in RAM, on-board memory included with the processor 1417, programmable read-only memory (PROM), erasable programmable read-only memory (EPROM), electrically erasable PROM (EEPROM), registers, and so forth, including combinations thereof.

Data 1403 and instructions 1405 may be stored in the memory 1401. The instructions 1405 may include one or more programs, routines, sub-routines, functions, procedures, code, etc. The instructions 1405 may include a single computer-readable statement or many computer-readable statements. The instructions 1405 may be executable by the processor 1417 to implement one or more of the methods described above. Executing the instructions 1405 may involve the use of the data 1403 that is stored in the memory 1401. FIG. 14 shows some instructions 1405a and data 1403a being loaded into the processor 1417 (which may come from instructions 1405 and data 1403 in memory 1401).

The wireless communication device 1416 may also include a transmitter 1413 and a receiver 1415 to allow transmission and reception of signals between the wireless communication device 1416 and a remote location (e.g., a communication device, base station, etc.). The transmitter 1413 and receiver 1415 may be collectively referred to as a transceiver 1411. An antenna 1409 may be electrically coupled to the transceiver 1411. The wireless communication device 1416 may also include (not shown) multiple transmitters, multiple receivers, multiple transceivers and/or multiple antennas.

In some configurations, the wireless communication device 1416 may include one or more microphones for capturing acoustic signals. In one configuration, a microphone may be a transducer that converts acoustic signals (e.g., voice, speech) into electrical or electronic signals. Additionally or alternatively, the wireless communication device 1416 may include one or more speakers. In one configuration, a speaker may be a transducer that converts electrical or electronic signals into acoustic signals.

The various components of the wireless communication device 1416 may be coupled together by one or more buses, which may include a power bus, a control signal bus, a status signal bus, a data bus, etc. For simplicity, the various buses are illustrated in FIG. 14 as a bus system 1407.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device for sending quantization quality feedback, comprising:
    a receiver configured to receive a signal;
    channel estimation circuitry coupled to the receiver, wherein the channel estimation circuitry is configured to generate a channel estimate based on the signal;
    feedback determination circuitry coupled to the channel estimation circuitry, wherein the feedback determination circuitry is configured to generate quantization quality feedback based on the channel estimate, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \bar{v}_j) = \frac{v_i^H \bar{v}_j}{|v_i^H \bar{v}_j|},$$

wherein $v_i$ is an estimated eigen-direction vector and $\bar{v}_j$ is a quantized eigen-direction vector at a codebook entry j; and
    a transmitter coupled to the feedback determination circuitry, wherein the transmitter is configured to transmit the quantization quality feedback.

2. The wireless communication device of claim 1, wherein the quantization quality feedback comprises a scalar value.

3. The wireless communication device of claim 1, wherein the feedback determination circuitry is configured to quantize the quantization quality feedback.

4. The wireless communication device of claim 1, wherein the quantization quality feedback is generated based on an estimated feedback and the quantized feedback.

5. The wireless communication device of claim 1, wherein the quantization quality feedback comprises a metric that measures the quantization quality.

6. The wireless communication device of claim 1, wherein the feedback determination circuitry is configured to quantize the one or more estimated eigen-directions based on a codebook.

7. A base station for receiving quantization quality feedback, comprising:
    a transmitter configured to send a signal;
    a receiver configured to receive quantization quality feedback, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \bar{v}_j) = \frac{v_i^H \bar{v}_j}{|v_i^H \bar{v}_j|},$$

wherein $v_i$ is an estimated eigen-direction vector and $\bar{v}_j$ is a quantized eigen-direction vector at a codebook entry j; and operations circuitry coupled to the receiver, wherein the operations circuitry is configured to perform an operation based on the quantization quality feedback.

8. The base station of claim 7, wherein the quantization quality feedback comprises a scalar value.

9. The base station of claim 7, wherein the operations circuitry is configured to extrapolate information based on the quantization quality feedback.

10. The base station of claim 7, wherein the operations circuitry is configured to determine a communication rate.

11. The base station of claim 7, wherein the operations circuitry is configured to schedule communications.

12. The base station of claim 11, wherein the operations circuitry is configured to determine a wireless communication device grouping to schedule the communications.

13. The base station of claim 7, wherein the operations circuitry is configured to determine a modulation for a communication channel.

14. The base station of claim 7, wherein the operations circuitry is configured to select a communication beam.

15. The base station of claim 7, wherein the operations circuitry is configured to determine link adaptation.

16. The base station of claim 7, wherein the operations circuitry is configured to determine interference suppression.

17. The base station of claim 7, wherein the operations circuitry is configured to determine a coding for a communication channel.

18. A method for sending quantization quality feedback by a wireless communication device, comprising:
receiving a signal;
generating a channel estimate based on the signal;
generating quantization quality feedback based on the channel estimate, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \bar{v}_j) = \frac{v_i^H \bar{v}_j}{|v_i^H \bar{v}_j|},$$

wherein $v_i$ is an estimated eigen-direction vector and $\bar{v}_j$ is a quantized eigen-direction vector at a codebook entry j; and
transmitting the quantization quality feedback.

19. The method of claim 18, wherein the quantization quality feedback comprises a scalar value.

20. The method of claim 18, further comprising quantizing the quantization quality feedback.

21. The method of claim 18, wherein the quantization quality feedback is generated based on an estimated feedback and the quantized feedback.

22. The method of claim 18, wherein the quantization quality feedback comprises a metric that measures the quantization quality.

23. The method of claim 18, further comprising quantizing the one or more estimated eigen-directions based on a codebook.

24. A method for receiving quantization quality feedback by a base station, comprising:
sending a signal;
receiving quantization quality feedback, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \bar{v}_j) = \frac{v_i^H \bar{v}_j}{|v_i^H \bar{v}_j|},$$

wherein $v_i$ is an estimated eigen-direction vector and $\bar{v}_j$ is a quantized eigen-direction vector at a codebook entry j; and
performing an operation based on the quantization quality feedback.

25. The method of claim 24, wherein the quantization quality feedback comprises a scalar value.

26. The method of claim 24, wherein performing the operation comprises extrapolating information based on the quantization quality feedback.

27. The method of claim 24, wherein performing the operation comprises determining a communication rate.

28. The method of claim 24, wherein performing the operation comprises scheduling communications.

29. The method of claim 28, wherein scheduling communications comprises determining a wireless communication device grouping.

30. The method of claim 24, wherein performing the operation comprises determining a modulation for a communication channel.

31. The method of claim 24, wherein performing the operation comprises selecting a communication beam.

32. The method of claim 24, wherein performing the operation comprises determining link adaptation.

33. The method of claim 24, wherein performing the operation comprises determining interference suppression.

34. The method of claim 24, wherein performing the operation comprises determining a coding for a communication channel.

35. A non-transitory tangible computer-readable medium having instructions thereon, the instructions comprising:
code for causing a wireless communication device to receive a signal;
code for causing the wireless communication device to generate a channel estimate based on the signal;
code for causing the wireless communication device to generate quantization quality feedback based on the channel estimate, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \overline{v}_j) = \frac{v_i^H \overline{v}_j}{|v_i^H \overline{v}_j|},$$

wherein $v_i$ is an estimated eigen-direction vector and $v_j$ is a quantized eigen-direction vector at a codebook entry j; and code for causing the wireless communication device to transmit the quantization quality feedback.

36. The non-transitory computer-readable medium of claim 35, wherein the quantization quality feedback comprises a scalar value.

37. The non-transitory computer-readable medium of claim 35, wherein the instructions further comprise code for causing the wireless communication device to quantize the quantization quality feedback.

38. A non-transitory tangible computer-readable medium having instructions thereon, the instructions comprising:
code for causing a base station to send a signal;
code for causing the base station to receive quantization quality feedback, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \overline{v}_j) = \frac{v_i^H \overline{v}_j}{|v_i^H \overline{v}_j|},$$

wherein $v_i$ is an estimated eigen-direction vector and $\overline{v}_j$ is a quantized eigen-direction vector at a codebook entry j; and code for causing the base station to perform an operation based on the quantization quality feedback.

39. The non-transitory computer-readable medium of claim 38, wherein the quantization quality feedback comprises a scalar value.

40. The non-transitory computer-readable medium of claim 38, wherein the code for causing the base station to perform the operation comprises code for causing the base station to determine a communication rate.

41. The non-transitory computer-readable medium of claim 38, wherein the code for causing the base station to perform the operation comprises code for causing the base station to schedule communications.

42. An apparatus for sending quantization quality feedback, comprising:
means for receiving a signal;
means for generating a channel estimate based on the signal;
means for generating quantization quality feedback based on the channel estimate, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \overline{v}_j) = \frac{v_i^H \overline{v}_j}{|v_i^H \overline{v}_j|},$$

wherein $v_i$ is an estimated eigen-direction vector and $\overline{v}_j$ is a quantized eigen-direction vector at a codebook entry j; and means for transmitting the quantization quality feedback.

43. The apparatus of claim 42, wherein the quantization quality feedback comprises a scalar value.

44. The apparatus of claim 42, further comprising means for quantizing the quantization quality feedback.

45. An apparatus for receiving quantization quality feedback, comprising:
means for sending a signal;
means for receiving quantization quality feedback, wherein the quantization quality feedback indicates a reliability of quantized feedback, and wherein the quantization quality feedback comprises a quantized version of a metric that indicates a similarity between one or more estimated eigen-directions and one or more quantized eigen-directions, wherein the metric is determined according to an equation $$D(v_i, \overline{v}_j) = \frac{v_i^H \overline{v}_j}{|v_i^H \overline{v}_j|},$$

wherein $v_i$ is an estimated eigen-direction vector and $\overline{v}_j$ is a quantized eigen-direction vector at a codebook entry j; and means for performing an operation based on the quantization quality feedback.

46. The apparatus of claim 45, wherein the quantization quality feedback comprises a scalar value.

47. The apparatus of claim 45, wherein the means for performing the operation comprises means for determining a communication rate.

48. The apparatus of claim 45, wherein the means for performing the operation comprises means for scheduling communications.

* * * * *